(12) United States Patent
Yasunari et al.

(10) Patent No.: US 6,591,015 B1
(45) Date of Patent: Jul. 8, 2003

(54) VIDEO CODING METHOD AND APPARATUS WITH MOTION COMPENSATION AND MOTION VECTOR ESTIMATOR

(75) Inventors: Tomoko Yasunari, Osaka (JP); Hideki Fukuda, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/362,102

(22) Filed: Jul. 28, 1999

(30) Foreign Application Priority Data

Jul. 29, 1998 (JP) ............................................. 10-213686

(51) Int. Cl.[7] .............................. G06K 9/36; G06K 9/46
(52) U.S. Cl. .................... 382/236; 375/240.13; 382/238
(58) Field of Search ................................. 382/232, 236, 382/238, 239; 375/240.02, 240.12, 240.13; 348/420.1, 421.1

(56) References Cited

U.S. PATENT DOCUMENTS

| | | | | |
|---|---|---|---|---|
| 5,057,918 A | * | 10/1991 | Denoyelle et al. | 348/402.1 |
| 5,600,375 A | * | 2/1997 | Wickstrom | 375/240.12 |
| 5,808,700 A | * | 9/1998 | Sugimoto et al. | 375/240.16 |
| 5,856,848 A | * | 1/1999 | Fujiwara et al. | 375/240.13 |
| 6,266,371 B1 | * | 7/2001 | Kondo | 348/699 |

FOREIGN PATENT DOCUMENTS

| | | | |
|---|---|---|---|
| JP | 8-149482 | 6/1963 | H04N/7/32 |
| JP | 8-98187 | 4/1996 | H04N/7/32 |
| JP | 9-219865 | 8/1997 | H04N/7/32 |
| JP | 10-51794 | 2/1998 | H04N/7/32 |

* cited by examiner

*Primary Examiner*—Timothy M. Johnson
(74) *Attorney, Agent, or Firm*—Nixon Peabody LLP; Thomas W. Cole

(57) ABSTRACT

A video coding method according to the present invention is adapted to predictively code each target block within a target frame relative to a reference frame. The method includes the steps of: a) calculating an estimate of the target block based on pixel values within the target block; b) calculating respective correction values for the target block and a predicted block associated with the target block, the predicted block being generated from the reference frame by motion compensation; c) correcting the pixel values within the target and predicted blocks using the respective correction values, and calculating a predicted error based on a difference between each said pixel value within the corrected target block and an associated one of the pixel values within the corrected predicted block; d) determining a coding mode based on the estimate of the target block and the predicted error; and e) coding the target block in accordance with the coding mode determined.

41 Claims, 18 Drawing Sheets

VIDEO CODING METHOD AND APPARATUS WITH MOTION COMPENSATION AND MOTION VECTOR ESTIMATOR

BACKGROUND OF THE INVENTION

The present invention relates to video coding method and apparatus and motion vector estimator for use in recording or transmitting a video signal.

In general, a current frame of a moving picture has high correlation with the previous frame thereof unless scenes are changed between them. Accordingly, in coding a moving picture, a motion-compensated inter-frame coding technique is ordinarily employed, i.e., a current frame is predicted and coded using a pair of frames preceding and succeeding the current frame.

Since inter-frame prediction always requires information about other frames, it is impossible to randomly access a desired frame. Thus, an intra-frame coding technique, i.e., coding a current frame using only the information about the frame itself, is also employed periodically. For example, according to the MEG (moving picture experts group) standards, a unit of intra-frame coding is called a "group of pictures (GOP)".

In coding a moving picture, a target frame is divided into a plurality of blocks, each consisting of a multiplicity of pixels neighboring each other, and each of these blocks divided is coded independently. That is to say, coding is performed on a block-by-block basis. For instance, in performing predictive coding, a block with the highest correlation with the target block is extracted as a predicted block from a reference frame preceding or succeeding the target frame. A predicted error block, which represents a difference between the target block and the predicted block, is quantizes and coded. When coding is performed using a reference frame preceding a target frame, the coding technique is called "forward predictive coding". Conversely, when coding is performed using a reference frame succeeding the target frame, the coding technique is called "backward predictive coding". And when coding is performed using a frame representing an average between the pair of frames preceding and succeeding the target frame as a reference frame, the coding technique is called "bidirectional predictive coding".

Since a predicted block should preferably be most similar to the target block, a block with the highest correlation with the target block is extracted as the predicted block from the blocks located within a search range in the reference frame. Specifically, differential blocks are obtained based on respective differences in luminance signal level between the target block and candidate blocks within the search range in the reference frame. By calculating the sum of absolute or squared pixel values within each of these differential blocks, one of the candidate blocks with a differential block having the smallest sum of absolute or squared pixel values is extracted as the predicted block.

In a moving picture, however, the location of the predicted block within the reference frame is different from that of the target block within the target frame. The direction and quantity representing this position al difference is called a "motion vector", which is also coded along with the predicted error block and used in decoding. Such a technique is called "motion compensation".

According to the MPEG standards, pictures are classified based on the coding mode thereof into the three types of: I-pictures, P-pictures and B-pictures. An I-picture is composed of nothing but intra blocks, in which only the information within the frame is coded without performing prediction. A P-picture is composed of forward-predicted blocks and intra blocks. And a B-picture is composed of forward-predicted blocks, backward-predicted blocks, bidirectional-predicted blocks and intra blocks.

Also, when inter-frame prediction is performed, frame prediction can be adaptively switched into field prediction, and vice versa, based on the state of the picture to increase the predictive efficiency. For example, an interlaced picture may sometimes be coded more efficiently by the field prediction technique.

As can be seen, a plurality of coding modes coexist according to the MPEG standards.

FIG. 16 is a block diagram illustrating a configuration of a conventional video coder. This video coder is adapted to select one of a plurality of coding modes and to code a target block based on the coding mode selected. In the following example, selectable coding modes are supposed to include forward prediction mode and intra-frame coding mode.

As shown in FIG. 16, the video coder includes: block divider 10; encoding section 40; decoding section 50; frame memory section 60; predicted block generator 70; and coding mode determining section 1600.

The coding mode determining section 1600 includes: a sum-of-squared-differences calculator 1601; a variance calculator 204; and a coding mode determiner 205.

The predicted block generator 70 receives a reference frame, which has been output from the frame memory section 60, and a target block $S_k$, which has been output from the block divider 10. The generator 70 extracts a block with the highest correlation with the target block $S_k$ from the reference frame, thereby outputting the extracted block as a forward-predicted block $P_k$.

In the coding mode determining section 1600, the variance calculator 204 calculates a variance $V_k$ of the target block $S_k$ and outputs the variance to the coding mode determiner 205. Receiving the target block $S_k$ and forward-predicted block $P_k$, The sum-of-squared-differences calculator 1601 obtains a predicted error $Ep_k$, that is, a sum of absolute or squared differences between the blocks of these two types, and outputs the predicted error $Ep_k$ to the coding mode determiner 205.

Comparing the variance $V_k$ to the predicted error $Ep_k$, the coding mode determiner 205 selects one of the coding modes allowed by the picture type specified, and outputs the coding mode selected to the encoding and decoding sections 40 and 50. For example, if an I-picture has been specified, then the determiner 205 determines the coding mode as intra-frame coding. FIG. 17 illustrates how the coding mode is determined by a test model (TM) technique according to the MPEG standards. If a P-picture, requiring prediction, has been specified, then the coding mode is determined as shown in FIG. 17.

In this manner, the conventional video coder obtains the variance of the target block and the predicted error of the predicted block, and selects one of a plurality of coding modes based on these values.

The method for compensating for a motion based on the magnitude of a predicted error in luminance signal level between blocks supposes that brightness conditions are the same between a target frame and a reference frame. In other words, this method supposes that an actually associated object on these frames is presented at substantially the same luminance signal level. However, in several types of pictures, such as a fade-in picture gradually brightens on the whole screen, a fade-out picture gradually darkening and a flash picture on which the brightness of the frame changes instantaneously, the luminance changes substantially uniformly over the entire screen. Accordingly, even if an object on a target frame is actually associated with an object on the reference frame, these objects are presented at mutually different luminance signal levels. Thus, in such a situation, the motion cannot be compensated for properly and an appropriate coding mode cannot be selected, either.

Next, the features of fade-in and fade-out pictures (in this specification, these pictures will be collectively referred to as "fading pictures") will be described in greater detail. FIG. 18 illustrates a variation in luminance signal level between a pixel located on a line within a frame (i.e., the $65^{th}$ frame in the illustrated example) of a quasi-still fade-out picture with almost no motion and a corresponding pixel located on the same line within a frame (i.e., the $70^{th}$ frame in the illustrated example) appearing later than the former frame. As shown in FIG. 18, although almost no motion happens in the fade-out picture, the luminance signal level greatly changes with time. That is to say, the value of a DC component (i.e., an average) considerably changes between the frames due to the fading effects. Accordingly, even if a target block is actually associated with a block in a reference frame, the sum of absolute or squared differences in the predicted error block amounts to a non-negligible value. Thus, the associated block cannot be estimated correctly or the motion cannot be compensated for precisely.

FIGS. 19A, 19B and 19C illustrate a problem arising in a fading picture. In these drawings, the hatched portion illustrates a gradually decreasing luminance signal level. FIG. 19A illustrates a forward reference frame and FIG. 19B illustrates a target frame. That is to say, FIGS. 19A and 19B illustrate respective frames of a fade-out picture with almost no motion, of which the luminance signal level gradually decreases.

In the illustrated example, the target block is the block $S_k$ shown in FIG. 19B and a predicted block is searched for within the search range SA shown in FIG. 19A. According to the conventional motion compensation technique, a predicted block is estimated based on a predicted error in luminance signal level between the block $S_k$ and the predicted block. Thus, a block $B_k$ shown in FIG. 19A, which has a luminance signal level closest to that of the block $S_k$, is estimated as the forward-predicted block. Suppose a forward prediction mode is selected after that, because an estimate, obtained by adding together the absolute or squared differences in the predicted error block, is small. In such a case, coding is performed using the block $B_k$ as the forward-predicted block. However, on a picture produced by decoding the resultant coded data, noise is superimposed at a location corresponding to the block $S_k$ as shown in FIG. 19C.

As can be seen, the motion of a fading picture cannot be precisely compensated for according to the conventional method, and the quality of a decoded picture adversely deteriorates.

To avoid such a problem, the motion compensation may be performed after the variation in luminance signal level between a target frame and a reference frame thereof due to fading has been eliminated. In other words, the motion compensation may be carried out using only AC components after the variation in DC components has been eliminated.

For example, as disclosed in Japanese Laid-Open Publication No. 8-98187, the variation in DC components may be eliminated by equalizing an average of pixel values in a block within the search range of a reference frame for prediction with that of pixel values in a target block.

In this manner, according to the conventional motion compensation technique, an average of pixel values in a block within the search range of a reference frame and that of pixel values in a target block are obtained on a block-by-block basis. And the pixel values are corrected so as to equalize these averages with each other. However, since the computational cost required for motion compensation is already very high, it is difficult to perform such additional processing. In addition, to store the average pixel values for respective blocks within the reference frame, the same number of memories as that of the blocks are needed.

Moreover, when a coding mode is selected, processing of correcting the pixel values in such a manner as to eliminate the fading effects is not carried out according to the conventional method. Accordingly, if the luminance signal level has changed over the entire screen due to fade-in or fade-out, the sum of absolute or squared differences also changes in the predicted error block, and an inappropriate coding mode may be selected as a result.

SUMMARY OF THE INVENTION

An object of the present invention is providing video coding method and apparatus and motion vector estimator, which make it possible to select an optimal one from several coding modes even if a luminance signal level has changed over the entire screen due to fading, for example, and to perform optimized motion compensation without increasing the computational cost so much.

A video coding method according to the present invention is adapted to predictively code each target block within a target frame relative to a reference frame. The method includes the steps of: a) calculating an estimate of the target block based on pixel values within the target block; b) calculating respective correction values for the target block and a predicted block associated with the target block, the predicted block being generated from the reference frame by motion compensation; c) correcting the pixel values within the target and predicted blocks using the respective correction values, and calculating a predicted error based on a difference between each said pixel value within the corrected target block and an associated one of the pixel values within the corrected predicted block; d) determining a coding mode based on the estimate of the target block and the predicted error; and e) coding the target block in accordance with the coding mode determined.

Another video coding method according to the present invention is also adapted to predictively code each target block within a target frame relative to a reference frame. The method includes the steps of: a) calculating an estimate of the target block based on pixel values within the target block; b) obtaining a predicted error block composed of a plurality of pixels representing differences between the pixel values within the target block and pixel values within a predicted block associated with the target block, and calculating an estimate of the predicted error block based on the pixel values within the predicted error block, the predicted block being generated from the reference frame by motion compensation; c) determining a coding mode based on the respective estimates of the target block and the predicted error block; and d) coding the target block in accordance with the coding mode determined.

Still another video coding method according to the present invention is also adapted to predictively code each target block within a target frame relative to a reference frame. The method includes the steps of: a) calculating a correction value for the target block; b) correcting pixel values within the target block using the correction value, and estimating a motion vector of the corrected target block relative to the reference frame; and c) coding the target block in accordance with the motion vector estimated.

A video coding apparatus according to the present invention is adapted to predictively code each target block within a target frame relative to a reference frame. The apparatus includes: first calculating means for calculating an estimate of the target block based on pixel values within the target block; correction value calculating means for calculating respective correction values for the target block and a predicted block associated with the target block, the predicted block being generated from the reference frame by motion compensation; second calculating means for correcting the pixel values within the target and predicted blocks using the respective correction values, and calculating a predicted error based on a difference between each said pixel value within the corrected target block and an associated one of the pixel values within the corrected predicted block; means for determining a coding mode based on the estimate of the target block and the predicted error; and means for coding the target block in accordance with the coding mode determined.

Another video coding apparatus according to the present invention is also adapted to predictively code each target block within a target frame relative to a reference frame. The apparatus includes: first calculating means for calculating an estimate of the target block based on pixel values within the target block; second calculating means for obtaining a predicted error block composed of a plurality of pixels representing differences between the pixel values within the target block and pixel values within a predicted block associated with the target block, and calculating an estimate of the predicted error block based on the pixel values within the predicted error block, the predicted block being generated from the reference frame by motion compensation; means for determining a coding mode based on the respective estimates of the target block and the predicted error block; and means for coding the target block in accordance with the coding mode determined.

Still another video coding apparatus according to the present invention is also adapted to predictively code each target block within a target frame relative to a reference frame. The apparatus includes: means for calculating a correction value for the target block; a motion estimator for correcting pixel values within the target block using the correction value, and estimating a motion vector of the corrected target block relative to the reference frame; and means for coding the target block in accordance with the motion vector estimated.

An apparatus for estimating a motion vector for each target block within a target frame relative to a reference frame according to the present invention includes: means for calculating a correction value for the target block; and a motion estimator for correcting pixel values within the target block using the correction value, and estimating a motion vector of the corrected target block relative to the reference frame.

According to the present invention, even if a luminance signal level has changed with time over the entire screen due to fading, for example, the effects of such a change in luminance signal level, which is caused between a target frame and a reference frame used for motion compensation, can be eliminated. Thus, an optimum motion vector can be estimated, and an optimum coding mode can be selected without selecting a prediction mode that might result in erroneous motion compensation. Also, even when a video coder according to the present invention includes only the motion compensating section or coding mode determining section, the video coder still can code a fading picture in an optimum coding mode.

DESCRIPTION OF THE PREFERRED EMBODIMENTS

Hereinafter, preferred embodiments of a video coder according to the present invention will be described with reference to the accompanying drawings.

Embodiment 1

Figure 1:
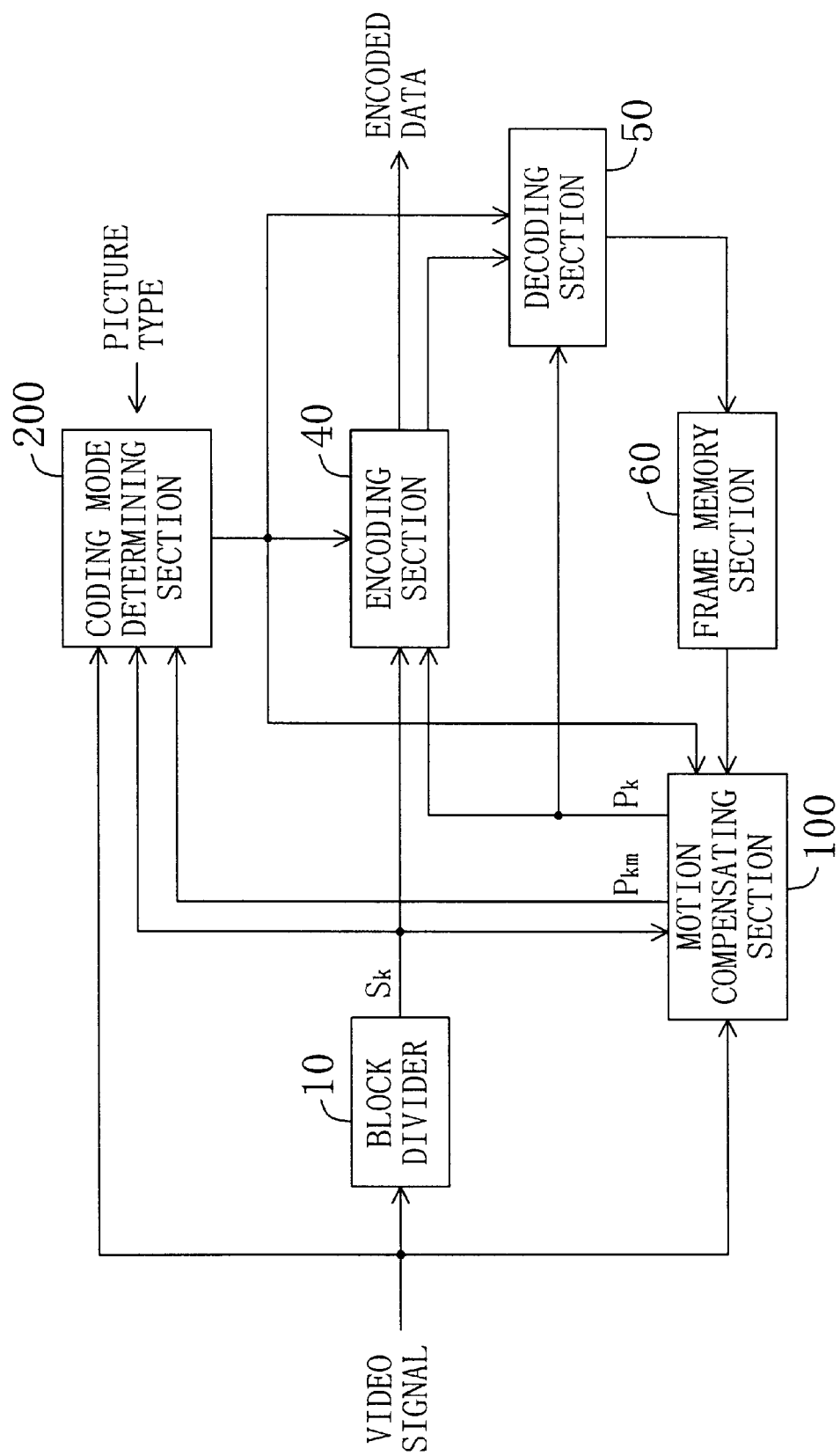
FIG. 1 is a block diagram illustrating a simplified configuration of a video coder according to a first embodiment of the present invention.
Figure 2:
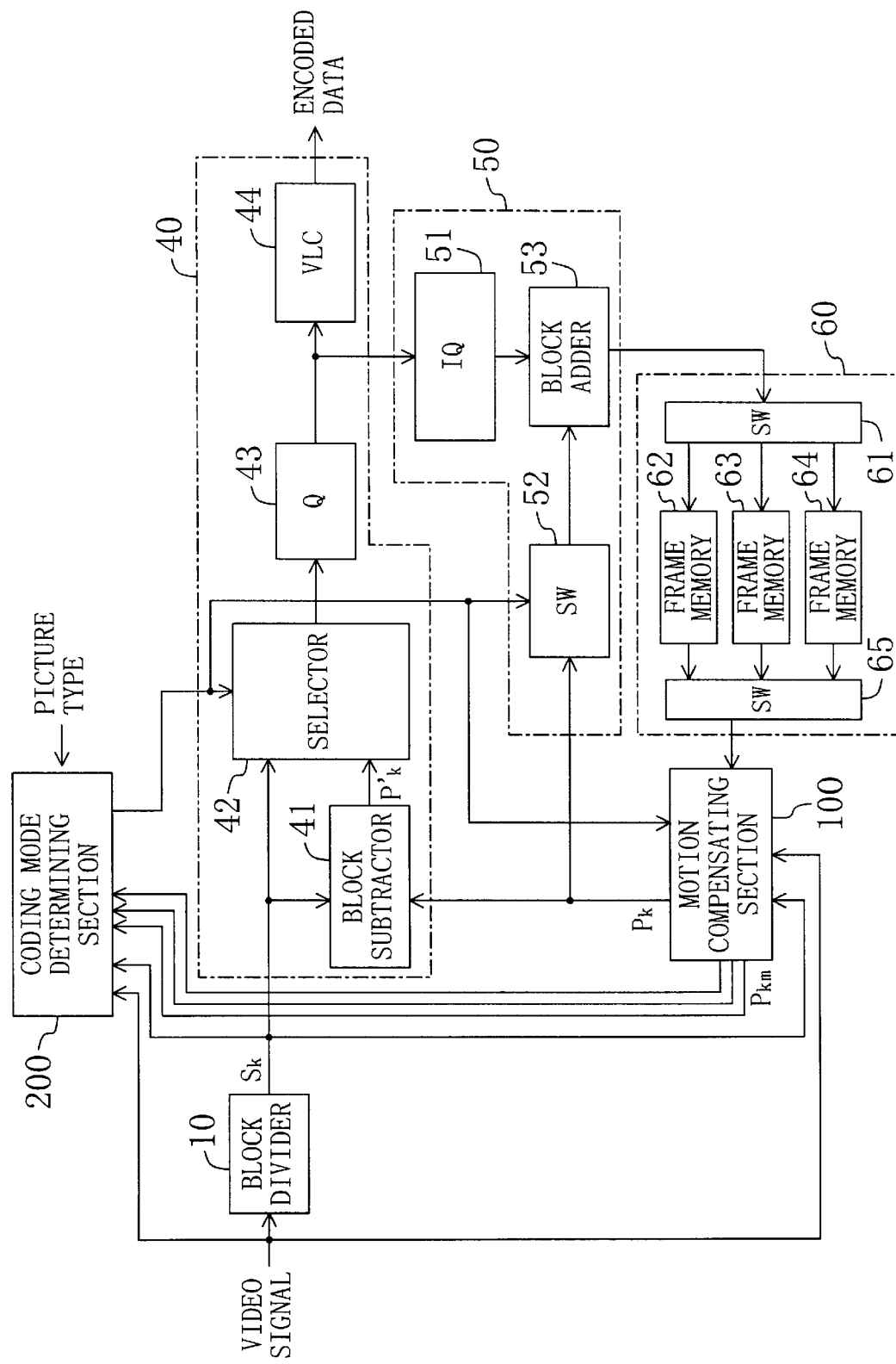
FIG. 2 is a block diagram illustrating a detailed configuration of the video coder according to the first embodiment.

FIG. 1 is a block diagram illustrating a simplified configuration of a video coder according to a first exemplary embodiment of the present invention. As shown in FIG. 1, the video coder includes: block divider 10; motion compensating section 100; coding mode determining section 200; encoding section 40; decoding section 50; and frame memory section 60. Respective components of the encoding, decoding and frame memory sections 40, 50, 60 are illustrated in detail in FIG. 2. Hereinafter, the video coder according to the first embodiment will be described mainly with reference to FIG. 2.

The encoding section 40 includes: block subtracter 41; selector 42; quantizes 43; and variable-length encoder 44. The decoding section 50 includes: inverse quantizes 51; switch 52; and block adder 53. The frame memory section 60 includes: first and second switches 61 and 65; and frame memories 62, 63 and 64.

A video signal is input to the block divider 10. The to video signal includes data representing a group of pictures, or frames, rearranged in the order of coding. That is to say, a plurality of frames to be coded are input as a video signal to the block divider 10. In response to this signal, the block divider 10 divides each of these frames into a plurality of blocks, each composed of a multiplicity of pixels neighboring one another. The divided blocks are processed as blocks $S_k$ to be coded (in this specification, these blocks will be called "target blocks") on a block-by-block basis.

According to the MPEG standards, for example, motion compensation or coding mode determination is performed on a macro block basis. Thus, each target block $S_k$ is of the size including 16×16 pixels.

In this specification, a total number of pixels within one block is represented by n. And the luminance values of respective pixels within a target block $S_k$ are represented as $S_k = \{S_1, S_2, S_3, \ldots, S_i, \ldots, S_n\}$. In the following description, a pixel value represents an associated luminance value.

The block divider 10 outputs the target block $S_k$ to the motion compensating section 100, coding mode determining section 200, block subtracter 41 and selector 42.

A target frame is externally input as a video signal to the motion compensating section 100. In addition, the target block $S_k$, a reference frame and a coding mode signal are input to the motion compensating section 100 from the block divider 10, frame memory section 60 and coding mode determining section 200, respectively. The coding mode signal represents intra-frame-coding mode, forward prediction mode, backward prediction mode or bidirectional prediction mode. In each of these forward, backward and bidirectional prediction modes, the motion compensating section 100 extracts a block with the highest correlation with the target block $S_k$ within a predetermined search range in each reference frame associated with each coding mode. Then, the motion compensating section 100 outputs the block extracted as a predicted block $P_{km}$ (={$P_{m1}$, $P_{m2}$, $P_{m3}$, ..., $P_{mi}$, ..., $P_{mn}$} (where m=1, 2, 3)) to the block subtracter 41, switch 52 and coding mode determining section 200. In the following description, when the subscript m is 1, forward prediction mode is indicated; when the subscript m is 2, backward prediction mode is indicated; and when the subscript m is 3, bidirectional prediction mode is indicated.

A picture type and a target frame, or a video signal, are externally input to the coding mode determining section 200. In addition, the target block $S_k$ and predicted block $P_{km}$ are input to the coding mode determining section 200 from the block divider 10 and motion compensating section 100, respectively. Based on the target frame, reference frame, target block $S_k$ and predicted block $P_{km}$, the coding mode determining section 200 selectively determines one of the coding modes enabled by the picture type externally specified. Then, the section 200 outputs the selected coding mode to the selector 42 and switch 52.

The block subtracter 41 calculates a predicted error block $P'_{km}$ (={$S_1-P_{m1}$, $S_2-P_{m2}$, $S_3-P_{m3}$, ..., $S_i-P_{mi}$, ..., $S_n-P_{mn}$} (where m=1, 2, 3)), which is a block representing a difference between the predicted block $P_{km}$ and target block $S_k$, and outputs the predicted error block $P'_{km}$ to the selector 42.

In accordance with the coding mode determined by the coding mode determining section 200, the selector 42 selects a block to be output. If the intra-frame-coding mode has been selected, the selector 42 outputs the target block $S_k$ to the quantizes 43. Otherwise, the selector 42 outputs the predicted error block $P'_{km}$ to the quantizes 43.

The quantizes 43 quantizes the block output from the selector 42 and outputs quantizes data to the variable-length encoder 44 and inverse quantizes 51.

The variable-length encoder 44 variable-length encodes the quantizes data output from the quantizes 43 and outputs resultant encoded data to the outside.

The inverse quantizes 51 inversely quantizes the quantizes data and outputs resultant inversely quantizes data to the block adder 53.

In accordance with the coding mode determined by the coding mode determining section 200, the switch 52 selectively outputs a block. If the intra-frame-coding mode has been selected, the switch 52 outputs a block, where all the pixel values are zero, to the block adder 53. Otherwise, the switch 52 outputs the predicted block Pkg. To the block adder The block adder 53 adds together the inversely quantizes data and the block output from the switch 52 on a pixel-by-pixel basis, thereby deriving decoded data and outputting the decoded data to the first switch 61.

The first switch 61 selects one of the frame memories 62, 63 and 64 as a memory on which the decoded data should be stored. For example, if P-picture decoded data, which is just previous to current decoded data, is stored on the frame memory 62, then the switch 61 stores the decoded data on the frame memory 63.

The second switch 65 selects one of the frame memories 62, 63 and 64 so as to read out a reference frame required by the individual coding mode, and outputs the reference frame to the motion compensating section 100. Suppose forward and backward prediction reference frames for the target block are stored on the frame memories 62 and 63, respectively. If a predicted block $P_{k1}$ should be generated by the motion compensating section 100 in the forward prediction mode, then only a forward prediction reference frame is needed. Accordingly, the second switch 65 selects the output of the frame memory 62 in such a case.

The frame memory section 60 can also output respective reference frames for forward, backward and bidirectional prediction.

Figure 3:
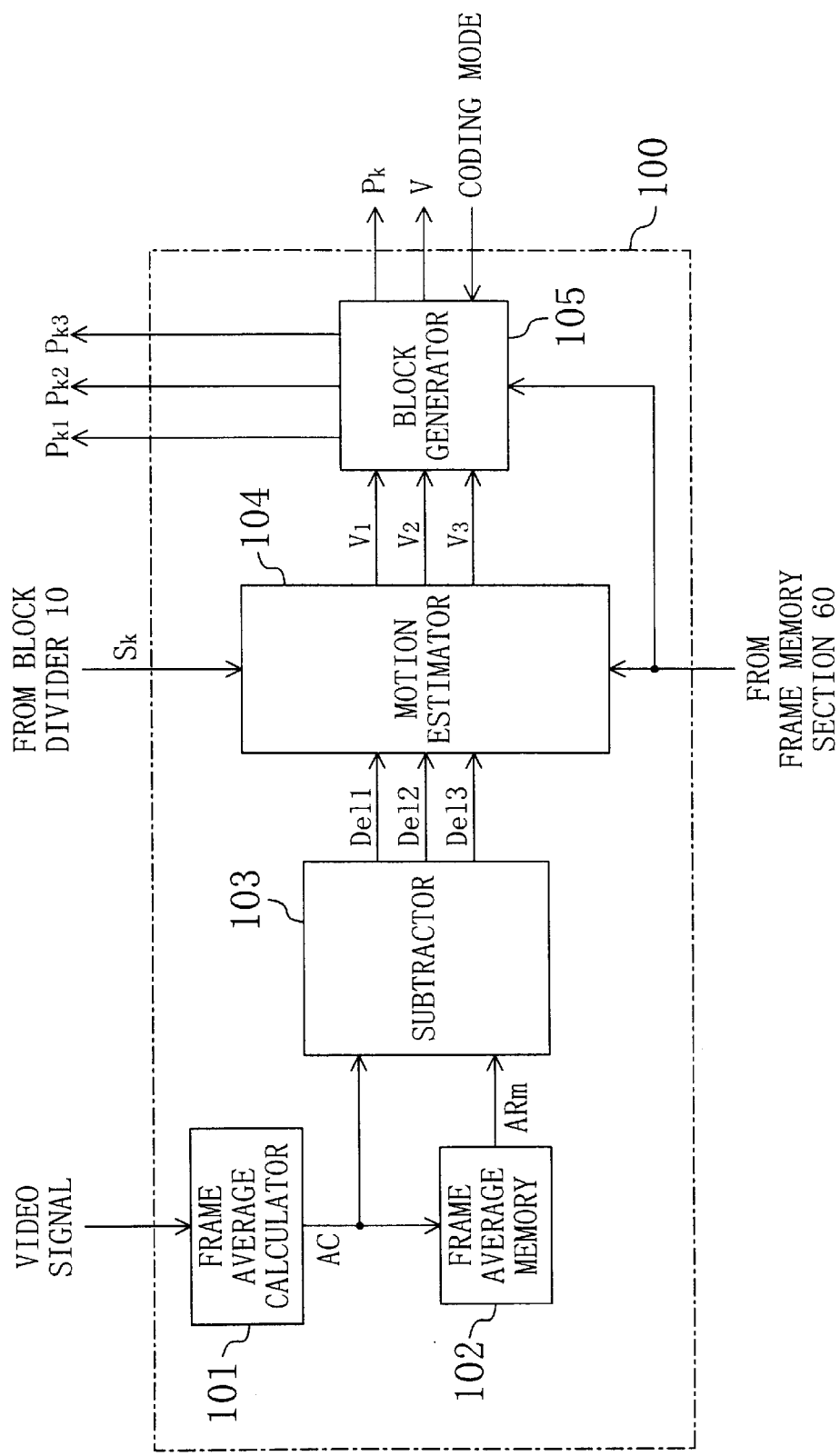
FIG. 3 is a block diagram illustrating a configuration of the motion compensating section shown in FIG. 2.

FIG. 3 is a block diagram illustrating a configuration of the motion compensating section 100. As shown in FIG. 3, the motion compensating section 100 includes: frame average calculator 101; frame average memory 102; subtracter 103; motion estimator 104; and block generator 105.

The frame average calculator 101, frame average memory 102 and subtracter 103 together operate as correction value calculating means as defined in the appended claims.

The frame average calculator 101 calculates an average AC of pixel values within the target frame, which has been input as a video signal. Then, the calculator 101 outputs the average AC to the frame average memory 102 and subtracter 103.

The frame average memory 102 stores thereon not only the average AC of pixel values within the target frame, but also an average of pixel values within a frame that was previously coded, i.e., an average of pixel values within the reference frame.

The subtracter 103 calculates respective differences De11, De12 and De13 between the averages $AR_1$, $AR_2$ and $AR_3$ of pixel values within reference frames $R_1$, $R_2$ and $R_3$ for forward, backward and bidirectional prediction, which are stored on the frame average memory 102, and the average AC of pixel values within the target frame. That is to say, $$De1m = AC - AR_m \text{ (where } m=1, 2, 3)$$

where De1m represents an increase in average luminance value of the target frame over each reference frame. The subtracter 103 outputs the differences De11, De12 and De13 as respective correction values to the motion estimator 104.

Receiving the target block $S_k$, pixel data within the search range of a reference frame stored on the frame memory section 60 and the difference De11, De12 or De13, the motion estimator 104 estimates a motion vector $V_1$, $V_2$ or $V_3$ for each prediction mode and outputs it to the block generator 105.

The motion estimator 104 evaluates a correlation between a target block $S_k$ and a candidate block $B_{km} = \{b_{m1}, b_{m2}, \ldots, b_{mi}, \ldots, b_{mn}\}$ (where m=1, 2, 3) of the same size as the target block $S_k$ by moving the candidate block $B_{km}$ within the search range in the reference frame associated with each of the forward, backward and bidirectional prediction modes. The motion estimator 104 obtains estimates $Eb_{k1}$, $Eb_{k2}$ and $Eb_{k3}$ in accordance with the following equation:

$$Eb_{km} = \sum_{i=1}^{n} |s_i - b_{mi} - De1m| \quad (1)$$

$$= \sum_{i=1}^{n} |(s_i - De1m) - b_{mi}| \text{ (where } m = 1, 2, 3)$$

The motion estimator 104 outputs, as the motion vector $V_m$, a quantity representing distance and direction from a candidate block $B_{km}$ with the smallest estimate $Eb_{km}$ to the target block $S_k$.

On the right side of Equation (1), $(S_1 - De1m)$ indicates that the increase in average luminance AC of pixels within the target frame over the average luminance AR of pixels within the reference frame should be deducted from each pixel within the target block $S_k$. In this manner, the estimate $Eb_{km}$ can be obtained while eliminating the effects of fading.

The equation for deriving the estimate $Eb_k$ may be modified in any arbitrary manner so long as the correlation between the candidate block $B_{km}$ within the search range and the target block $S_k$ can be obtained. For example, the following Equation (2) may also be used:

$$Eb_{km} = \sum_{i=1}^{n} (s_i - b_{mi} - De1m)^2 \quad (2)$$

$$= \sum_{i=1}^{n} \{(s_i - De1m) - b_{mi}\}^2 \text{ (where } m = 1, 2, 3)$$

Receiving the motion vector $V_1$, $V_2$ or $V_3$ and the reference frame, the block generator 105 obtains a predicted block $P_{k1}$, $P_{k2}$ or $P_{k3}$ associated with the target block $S_k$ for each prediction mode, and outputs the block $P_{k1}$, $P_{k2}$ or $P_{k3}$ to the coding mode determining section 200. The block generator 105 also receives the coding mode signal output from the coding mode determining section 200, selects predicted block $P_k$ and motion vector V associated with the coding mode specified, and then outputs the predicted block $P_k$ to the block divider 41 and switch 52. The block generator 105 further outputs the motion vector V to the variable-length encoder 44 although not shown.

As described above, in the video coder of the present invention, the motion compensating section 100 shown in FIG. 3 corrects the target block $S_k$ in such a manner as to equalize the average AC of pixel values within the target frame with the average $AR_m$ of pixel values within each reference frame, and estimates a motion vector $V_m$. And the motion compensating section 100 outputs the predicted block $P_{km}$, which has been generated based on the motion vector $V_m$ and reference frame. By performing this processing of equalizing the averages between frames, the DC components can be equalized with each other between the frames. In other words, block matching can be performed only with the AC components. Accordingly, it is possible to prevent an erroneous motion vector from being estimated for an image with a fading effect. The method of the present invention is applicable particularly effectively to a situation where the level of a luminance signal is substantially uniform within the same frame. Also, since the averages are obtained on a frame-by-frame basis, the computational cost may be lower compared to calculating the averages on a block basis. Furthermore, since no average should be stored on a block basis, the required memory capacity can be smaller.

Figure 4:
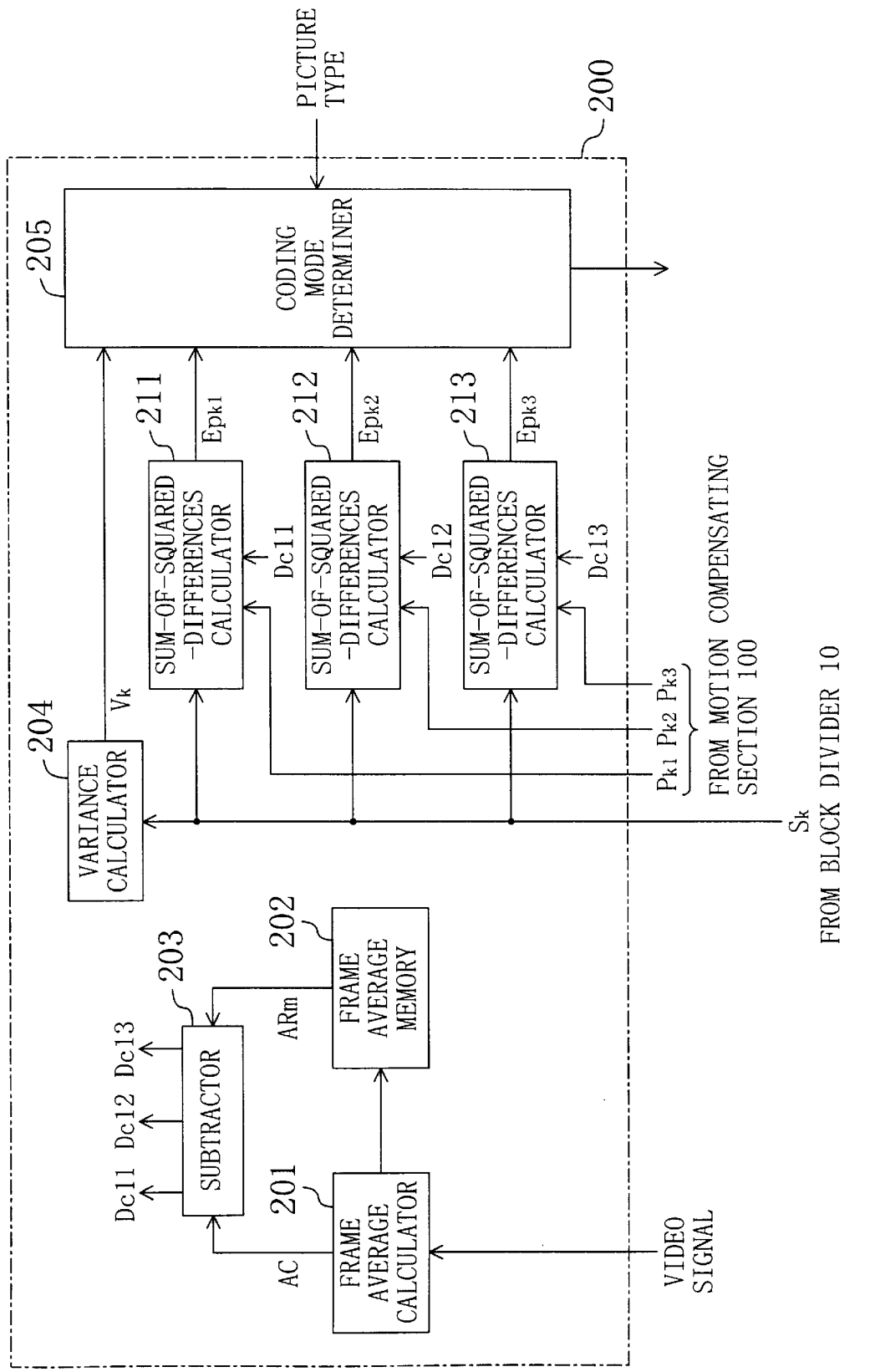
FIG. 4 is a block diagram illustrating a configuration of the coding mode determining section shown in FIG. 2.

FIG. 4 is a block diagram illustrating a configuration of the coding mode determining section 200. As shown in FIG. 4, the coding mode determining section 200 includes: frame average calculator 201; frame average memory 202; subtracter 203; variance calculator 204 (which is equivalent to the first calculating means as defined in the appended claims); a set of sum-of-squared-differences calculators 211, 212, 213 (which is equivalent to the second calculating means as defined in the appended claims); and a coding mode determiner 205. The frame average calculator 201, frame average memory 202 and subtracter 203 together operate as the correction value calculating means as defined in the appended claims.

The frame average calculator 201 calculates an average AC of pixel values within the target frame, which has been input as a video signal. Then, the calculator 201 outputs the average AC to the frame average memory 202 and subtracter 203.

The frame average memory 202 stores thereon not only the average AC of pixel values within the target frame, but also an average of pixel values within a frame that was previously coded, i.e., an average of pixel values within each reference frame.

The subtracter 203 calculates respective differences Dc11, Dc12 and Dc13 between the averages $AR_1$, $AR_2$ and $AR_3$ of pixel values within reference frames $R_1$, $R_2$ and $R_3$ for forward, backward and bidirectional prediction, which are stored on the frame average memory 202, and the average AC of pixel values within the target frame. That is to say, $$Dc1m = AC - AR_m \text{ (where } m=1, 2, 3)$$

where Dc1m represents an increase in average luminance value of the target frame over each reference frame. The subtracter 203 outputs the differences Dc11, Dc12 and Dc13 as correction values to the sum-of-squared-differences calculators 211, 212, 213, respectively.

In this embodiment, the differences Dc11, Dc12, D13 in average luminance between the target frame and the reference frames are equal to the difference De11, De12, De13 in average luminance that are obtained by the motion compensating section 100. Accordingly, the frame average calculator 201, frame average memory 202 and subtracter 203 may be omitted and the differences De11, De12, De13, which are output by the subtracter 103 of the motion compensating section 100, may be input to the sum-of-squared-differences calculators 211, 212, 213, respectively.

Receiving the target block $S_k$, the predicted block $P_{k1}$, $P_{k2}$ or $P_{k3}$ and the difference Dc11, Dc12 or Dc13, the sum-of-squared-differences calculator 211, 212 or 213 obtains a predicted error $Ep_{k1}$, $Ep_{k2}$ or $Ep_{k3}$ in accordance with the following equation:

$$Ep_{km} = \sum_{i=1}^{n} (s_i - p_{mi} - Dc1m)^2 \quad (3)$$

$$= \sum_{i=1}^{n} \{(s_i - Dc1m) - p_{mi}\}^2 \text{ (where } m = 1, 2, 3)$$

And the calculator 211, 212 or 213 outputs the predicted error $Ep_{k1}$, $Ep_{k2}$ or $Ep_{k3}$ to the coding mode determiner 205.

As in Equation (1), ($S_i$–Dc1m) on the right side of Equation (3) indicates that the increase in average luminance AC of pixel values within the target frame over the average luminance $AR_m$ of pixel values within the reference frame should be deducted from each pixel within the target block $S_k$. In this manner, the predicted error $Ep_{km}$ can be obtained while eliminating the effects of fading. Equation (3) is used for deriving the predicted error $Ep_{km}$ by calculating a sum of squared differences between the corrected target block $S_k$ and the predicted block $P_{km}$. This Equation (3) may be modified in any arbitrary manner so long as the error between the target block $S_k$ and the predicted block $P_{km}$ can be obtained. For example, the following Equation (4) for deriving a sum of absolute differences between the corrected target block $S_k$ and the predicted block $P_{km}$ may also be used:

$$Ep_k = \sum_{i=1}^{n} |s_i - p_{mi} - Dc1m| \quad (4)$$

$$= \sum_{i=1}^{n} |(s_i - Dc1m) - p_{mi}| \text{ (where } m = 1, 2, 3)$$

Receiving the target block $S_k$, the variance calculator 204 calculates the variance $V_k$ of the target block $S_k$ as an estimate of the target block $S_k$. That is to say, the calculator 204 obtains the sum of squared deviations of respective pixel values from the average by the following equation:

$$V_k = \Sigma_{i=0}^{n} (S_i - AS_k)^2$$

where $AS_k$ is an average of pixel values within the target block $S_k$. Then, the calculator 204 outputs the resultant sum to the coding mode determiner 205. As the estimate of the target block $S_k$, any other value (e.g., a sum of absolute deviations of respective pixel values from the average) may be employed.

Receiving the picture type of the target frame, the variance $V_k$ and the predicted error $Ep_{k1}$, $Ep_{k2}$ or $Ep_{k3}$, the coding mode determiner 205 determines the coding mode for the target block $S_k$, and outputs the coding mode determined to the selector 42, switch 52 and block generator 105.

The coding mode determiner 205 determines the coding mode in the following manner. If the picture is an I-picture, then the coding mode determiner 205 determines the mode as intra-frame coding. If the picture is a P-picture, then the coding mode determiner 205 determines the mode as either intra-frame coding or forward prediction. For example, the coding mode determiner 205 compares a predicted error $Ep_{k1}$, which has been obtained based on a predicted block by forward prediction, to a variance $V_k$. If the variance $V_k$ has turned out to be smaller than the predicted error $Ep_{k1}$ as a result of this comparison, then the determiner 205 may choose the intra-frame-coding mode. Alternatively, if the predicted error $Ep_{k1}$ is smaller than the variance $V_k$, then the determiner 205 may choose the forward prediction mode. Furthermore, if the picture is a B-picture, then the coding mode determiner 205 determines the coding mode as intra-frame coding, forward prediction, backward prediction or bidirectional prediction. In this case, the coding mode may be determined in the following manner. For example, a comparison may be carried out among the variance $V_k$ and the predicted errors $Ep_{k1}$, $Ep_{k2}$ and $Ep_{k3}$ obtained in forward, backward and bidirectional prediction modes, respectively. If the variance $V_k$ is the smallest of all, then the intra-frame coding may be selected. Alternatively, if any of the predicted errors $Ep_{k1}$, $Ep_{k2}$ or $Ep_{k3}$ is the smallest, then the coding mode may be determined as the prediction mode associated with the smallest predicted error $Ep_{k1}$, $Ep_{k2}$ or $Ep_{k3}$. Also, the coding mode may be determined in compliance with a TM technique according to the MPEG standards.

Moreover, if the coding mode determiner 205 has decided that frame prediction should be performed on the target frame considering the image quality thereof, then the determiner 205 may weight the predicted error obtained by the frame prediction so as to determine the coding mode based on the predicted error weighted.

As described above, in the video coder of the present invention, the coding mode determining section 200 shown in FIG. 4 corrects the target block $S_k$ in such a manner as to equalize the average AC of pixel values within the target frame with the average $AR_m$ of pixel values within the reference frame. And the coding mode determining section 200 obtains the predicted error $Ep_{km}$ and determines the coding mode based on the predicted error $Ep_{km}$. By performing this processing of equalizing the averages between frames, the DC components can be equalized with each other between the frames. In other words, the predicted error $Ep_{km}$ can be estimated using only the AC components while eliminating the fading effects between the frames. As a result, it is possible to avoid a situation where a coding mode is selected after a predicted block has been generated by erroneous motion compensation. The method of the present invention is applicable particularly effectively to a situation where a luminance signal level is substantially uniform within the same frame.

Also, since the averages are obtained on a frame-by-frame basis, the computational cost may be lower compared to calculating the averages on a block-by-block basis. Furthermore, since no average should be stored on a block basis, the required memory capacity can be smaller.

In the foregoing embodiment, the average of pixel values within a target frame is corrected to be equal to the average of pixel values within a reference frame. Alternatively, the correction may be performed in the opposite way. That is to say, the average of pixel values within a reference frame may be equalized with the average of pixel values within a target frame.

Also, in this embodiment, an average luminance value for a frame is stored on the frame average memory 102 or 202.

Optionally, the frame average memories 102 and 202 may be omitted and an average of luminance values within a reference frame may be calculated again when required.

The video coder according to this embodiment includes both the motion compensating section 100 and the coding mode determining section 200. If necessary, one of these sections 100 or 200 may be omitted.

Embodiment 2

Figure 5:
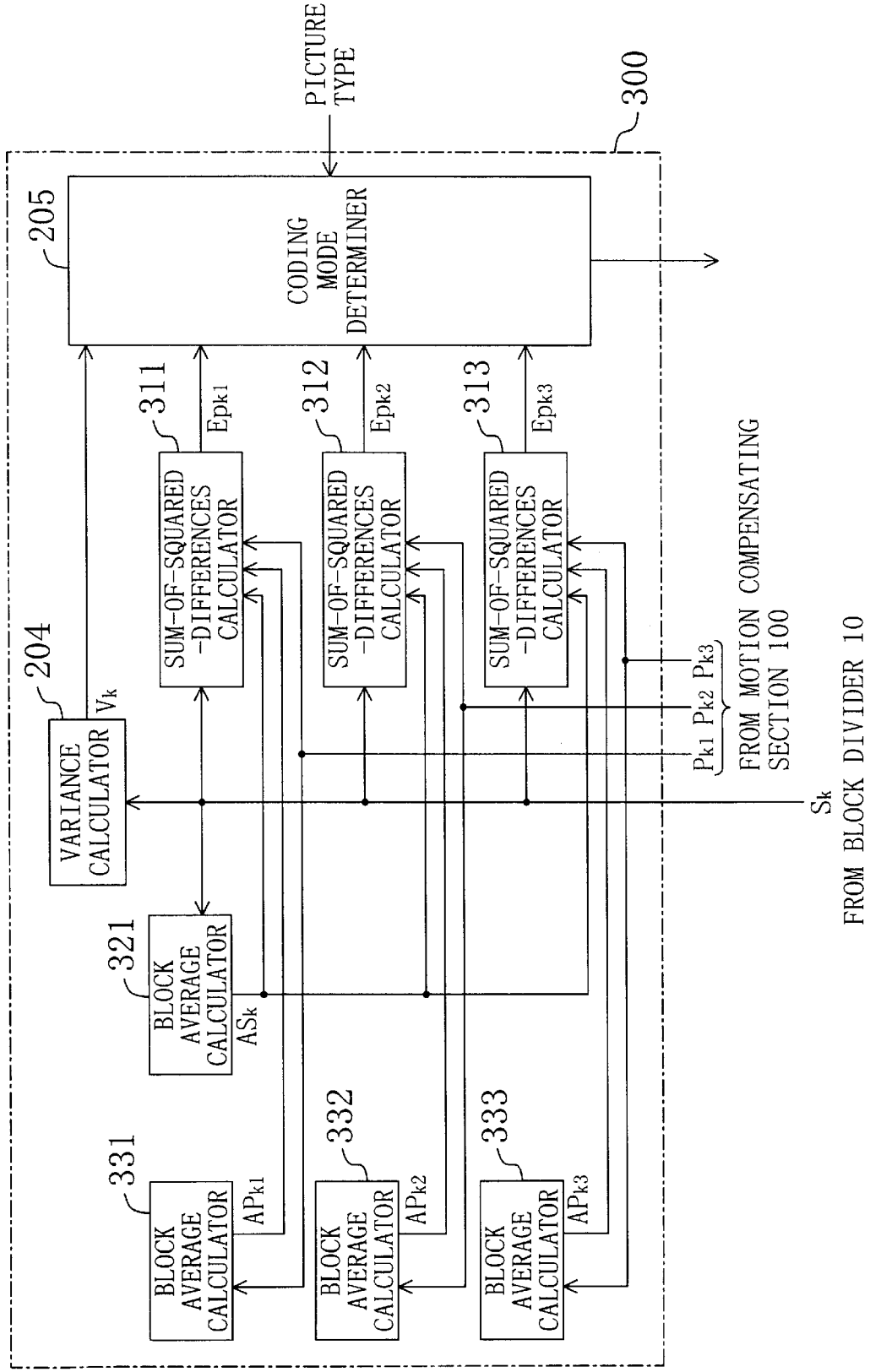
FIG. 5 is a block diagram illustrating a configuration of a coding mode determining section in a video coder according to a second embodiment of the present invention.

FIG. 5 is a block diagram illustrating a configuration for a coding mode determining section 300 according to a second exemplary embodiment of the present invention. The second embodiment is different from the first embodiment only by substituting the coding mode determining section 300 shown in FIG. 5 for the coding mode determining section 200 shown in FIG. 2, and the description of the other sections will be omitted herein.

As shown in FIG. 5, the coding mode determining section 300 includes: a set of block average calculators 321, 331, 332, 333; a variance calculator 204, which is equivalent to the first calculating means as defined in the appended claims; a coding mode determiner 205; and a set of sum-of-squared-differences calculators 311, 312, 313, which are equivalent to the second calculating means as defined in the appended claims. The variance calculator 204 and coding mode determiner 205 are the same as the counterparts shown in FIG. 4, and the description thereof will be omitted herein.

In the following description, only the components associated with the forward prediction will be exemplified, because a similar principle is applicable to the backward or bidirectional prediction.

The block average calculator 321 receives the target block $S_k$, calculates an average $AS_k$ of pixel values within the target block $S_k$ and outputs the average $AS_k$ as a correction value to the sum-of-squared-differences calculator 311.

The block average calculator 331 receives the predicted block $P_{k1}$ obtained by forward prediction, calculates an average $AP_{k1}$ of pixel values within the predicted block $P_{k1}$ and outputs the average $AP_{k1}$ as a correction value to the sum-of-squared-differences calculator 311.

Receiving the target block $S_k$, the average $AS_k$ of pixel values within the target block $S_k$, the predicted block $P_{k1}$ and the average $AP_{k1}$ of pixel values within the predicted block $P_{k1}$, the sum-of-squared-differences calculator 311 obtains a predicted error $Ep_{k1}$ by the following equation:

$$Ep_{km} = \sum_{i=1}^{n} (s_i - p_{mi} + AP_{km} - AS_k)^2 \quad (5)$$

$$= \sum_{i=1}^{n} \{(s_i - AS_k) - (p_{mi} - AP_{km})\}^2 \text{ (where } m = 1, 2, 3\text{)}$$

And the calculator 311 outputs the predicted error $Ep_{k1}$ to the coding mode determiner 205.

As represented by Equation (5), the predicted error $Ep_{k1}$ can be obtained as a sum of squared differences, each representing a difference between each pixel value within the target block $S_k$ minus the average $AS_k$ thereof and an associated pixel value within the predicted block $P_{k1}$ minus the average $AP_{k1}$ thereof. That is to say, the sum-of-squared-differences calculator 311 corrects the pixel values within each target block $S_k$ and the associated predicted block $P_{k1}$ such that the average thereof within each of these blocks becomes zero, and then obtains a sum of squared differences between each pixel value within the corrected target block and an associated pixel value within the corrected predicted block. In Equation (5), a sum of absolute differences may be derived instead of the sum of squared differences.

As to the backward and bidirectional predictions, the predicted errors $Ep_{k2}$ and $Ep_{k3}$ are obtained in similar manners and input to the coding mode determiner 205. The coding mode determiner 205 determines the coding mode based on the variance $V_k$ and the predicted errors $Ep_{k1}$, $Ep_{k2}$ and $Ep_{k3}$.

As described above, the video coder according to this embodiment calculates an average $AS_k$ of pixel values within the target block $S_k$ and an average $AP_{k1}$ of pixel values within the predicted block $P_{k1}$ for example, corrects the pixel values within these blocks by subtracting the associated averages thereof from the pixel values and then obtains the predicted error $Ep_{k1}$, for example. That is to say, the values of DC components within these blocks are set equal to zero by subtracting the averages from the pixel values within the blocks, thereby eliminating the effects of a special presentation such as fade-in or fade-out. Accordingly, the predicted error can be estimated with only the AC components. As a result, it is possible to avoid selecting a coding mode with a predicted block generated by erroneous motion compensation.

In the foregoing embodiment, the values of DC components are set equal to zero. Alternatively, the respective pixel values may also be corrected to equalize the average of pixel values within the target block $S_k$ and predicted blocks $P_{k1}$, $P_{k2}$ and $P_{k3}$ used for determining the coding mode.

Embodiment 3

Figure 6:
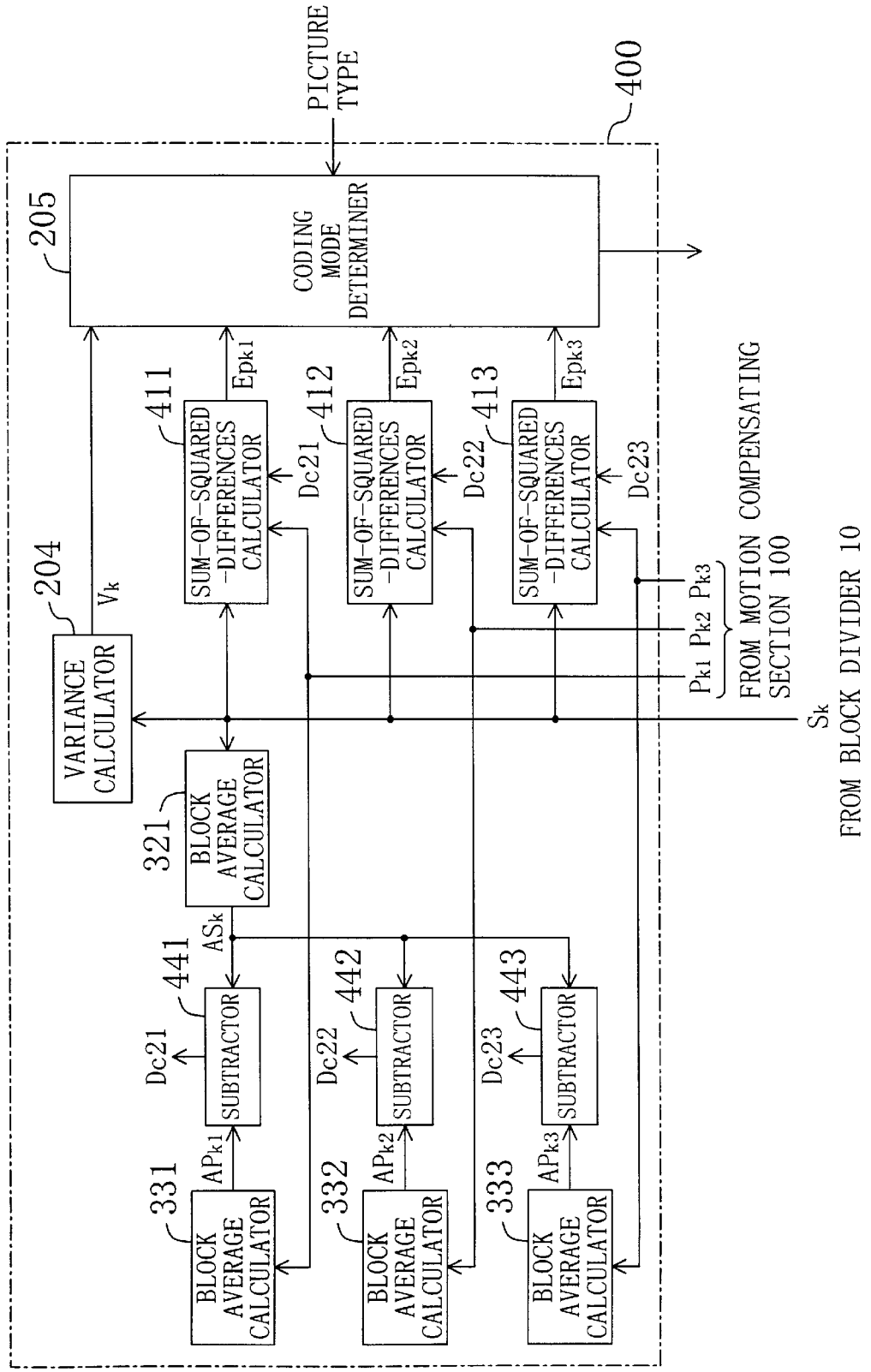
FIG. 6 is a block diagram illustrating a configuration of a coding mode determining section in a video coder according to a third embodiment of the present invention.

FIG. 6 is a block diagram illustrating a configuration for a coding mode determining section 400 according to a third exemplary embodiment of the present invention. The third embodiment is different from the first embodiment only by substituting the coding mode determining section 400 shown in FIG. 6 for the coding mode determining section 200 shown in FIG. 2, and the description of the other sections will be omitted herein.

As shown in FIG. 6, the coding mode determining section 400 includes: a set of block average calculators 321, 331, 332, 333; a set of subtracters 441, 442, 443; a variance calculator 204, which is equivalent to the first calculating means as defined in the appended claims; a coding mode determiner 205; and a set of sum-of-squared-differences calculators 411, 412, 413, which are equivalent to the second calculating means as defined in the appended claims. The block average calculators 321, 331, 332, 333 and subtracters 441, 442, 443 together operate as the correction value calculating means as defined in the appended claims. The variance calculator 204 and coding mode determiner 205 are the same as the counterparts shown in FIG. 4, and the description thereof will be omitted herein.

In the following description, only the components associated with the forward prediction will be exemplified, because a similar principle is applicable to the backward or bidirectional prediction.

The block average calculator 321 receives the target block $S_k$, calculates an average $AS_k$ of pixel values within the target block $S_k$ and outputs the average $AS_k$ to the subtracter 441.

The block average calculator 331 receives the predicted block $P_{k1}$ obtained by forward prediction, calculates an average $AP_{k1}$ of pixel values within the predicted block $P_{k1}$ and outputs the average $AP_{k1}$ to the subtracter 441.

The subtracter 441 receives not only the average $AS_k$ of pixel values within the target block $S_k$, but also the average $AP_{k1}$ of pixel values within the predicted block $P_{k1}$, obtains a difference Dc21 and outputs the difference as a correction value to the sum-of-squared-differences calculator 411. The difference Dc21 is given by $$Dc2m = AS_k - AP_{km} \quad (m=1, 2, 3)$$

That is to say, the difference Dc21 represents an increase in average $AS_k$ of pixel values within the target block $S_k$ over the average $AP_{k1}$ of pixel values within the predicted block $P_{k1}$.

Receiving the target block $S_k$, the predicted block $P_{k1}$ and the difference Dc21, the sum-of-squared-differences calculator 411 obtains a predicted error $Ep_{k1}$ by the following equation:

$$Ep_{km} = \sum_{i=1}^{n} (s_i - p_{mi} - Dc2m)^2 \quad (6)$$

$$= \sum_{i=1}^{n} \{(s_i - Dc2m) - p_{mi}\}^2 \text{ (where } m = 1, 2, 3)$$

And the calculator 411 outputs the predicted error $Ep_{k1}$ to the coding mode determiner 205.

As represented by Equation (6), the predicted error $Ep_{k1}$ can be obtained as a sum of squared differences, each representing a difference between each pixel value within the target block $S_k$ minus the difference Dc21 and an associated pixel value within the predicted block $P_{k1}$. That is to say, the sum-of-squared-differences calculator 411 corrects the pixel values such that the average $AS_k$ of pixel values within the target block $S_k$ is equalized with the average $AP_{k1}$ of pixel values within the predicted block $P_{k1}$, and then obtains a sum of squared differences between each pixel value within the corrected target block and an associated pixel value within the corrected predicted block $P_{k1}$. In Equation (6), a sum of absolute differences may be derived instead of the sum of squared differences.

As to the backward and bidirectional predictions, the predicted errors $Ep_{k2}$ and $Ep_{k3}$ are obtained in similar manners and input to the coding mode determiner 205. The coding mode determiner 205 determines the coding mode based on the variance $V_k$ and the predicted errors $Ep_{k1}$, $Ep_{k2}$ and $Ep_{k3}$.

As described above, the video coder according to this embodiment corrects the pixel values within the target block $S_k$ such that the average $AS_k$ of pixel values within the target block $S_k$ is equalized with the average $AP_{k1}$ of pixel values within the predicted block $P_{k1}$, and then obtains the predicted error $Ep_{k1}$. That is to say, the averages of pixel values are equalized between these blocks, thereby equalizing the values of DC components between the blocks and eliminating the effects of a special presentation such as fade-in or fade-out. Accordingly, the predicted error can be estimated with only the AC components. As a result, it is possible to avoid selecting a coding mode with a predicted block generated by erroneous motion compensation.

In the foregoing embodiment, the average $AS_k$ of pixel values within the target block $S_k$ is equalized with the average $AP_{k1}$ of pixel values within the predicted block $P_{k1}$. Conversely, the average $AP_{k1}$ of pixel values within the predicted block $P_{k1}$ may be equalized with the average $AS_k$ of pixel values within the target block $S_k$.

Embodiment 4

In the motion compensating section 100 and the coding mode determining section 200 of the first embodiment, the same value (AC–AR$_1$), for example, is subtracted from any target block within the same frame to equalize the average AC for the target frame with the average AR, for the reference frame. Such a correction is effective when the luminance signal level is substantially uniform within the same frame. However, the luminance signal level may differ even within the same frame depending on the pattern of the picture. Accordingly, in a fading-in or fading-out picture, a variation in luminance signal level differs depending on the location. That is to say, a variation in luminance signal level in a relatively dark region is smaller than that in a relatively bright region on the screen.

Figure 7:
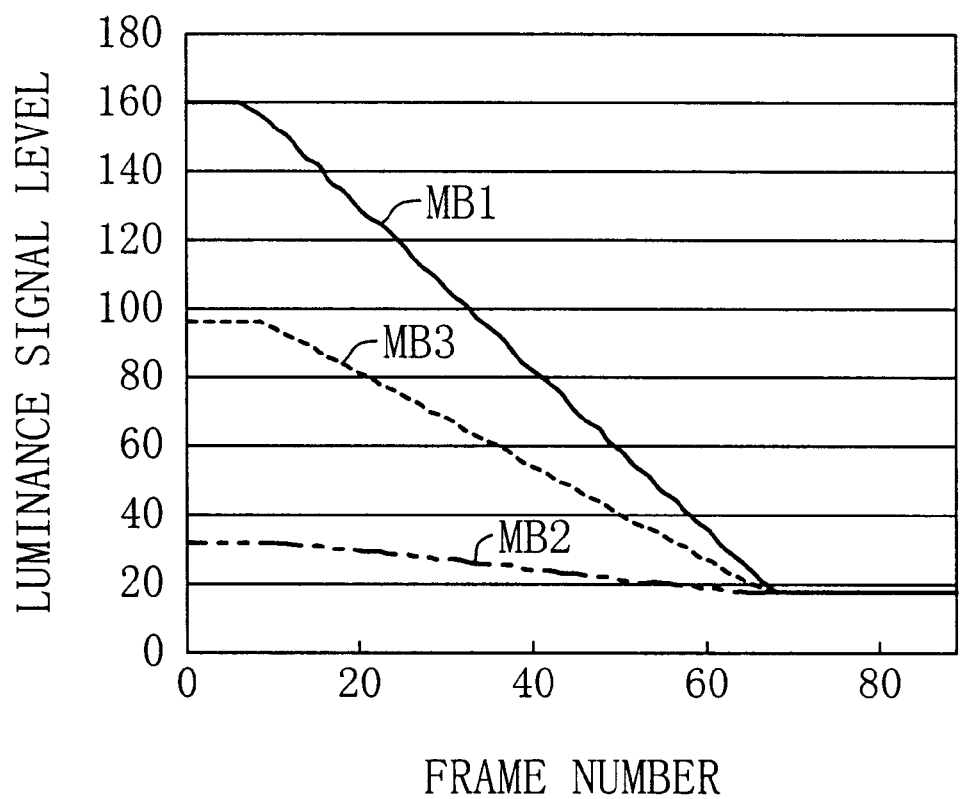
FIG. 7 is a graph illustrating an average luminance signal level within a macro block where a still picture is fading out.

FIG. 7 is a graph illustrating an average luminance signal level within a macro block where a still picture is fading out. In FIG. 7, MB1, MB2 and MB3 denotes respective luminance signal levels of a relatively bright part on a screen, a relatively dark part thereof and a part with an intermediate, or average, brightness. Also, in FIG. 7, the frame number increases with time. As shown in FIG. 7, when the picture is fading out, the luminance signal level varies non-uniformly within the same frame with the passage of time. Thus, if the pixel values are corrected by subtracting the same value from each and every part of the frame as is done in the first embodiment, such a correction is not so effective in such parts of the frame (e.g., the parts MB1 and MB2) as having luminance signal levels far different from the average level thereof.

Accordingly, it is imaginable to correct the average of pixel values within the target block depending on a ratio of the average of pixel values within the target frame to the average of pixel values within the reference frame. In this embodiment, a video coder implementing such a method will be described.

Figure 8:
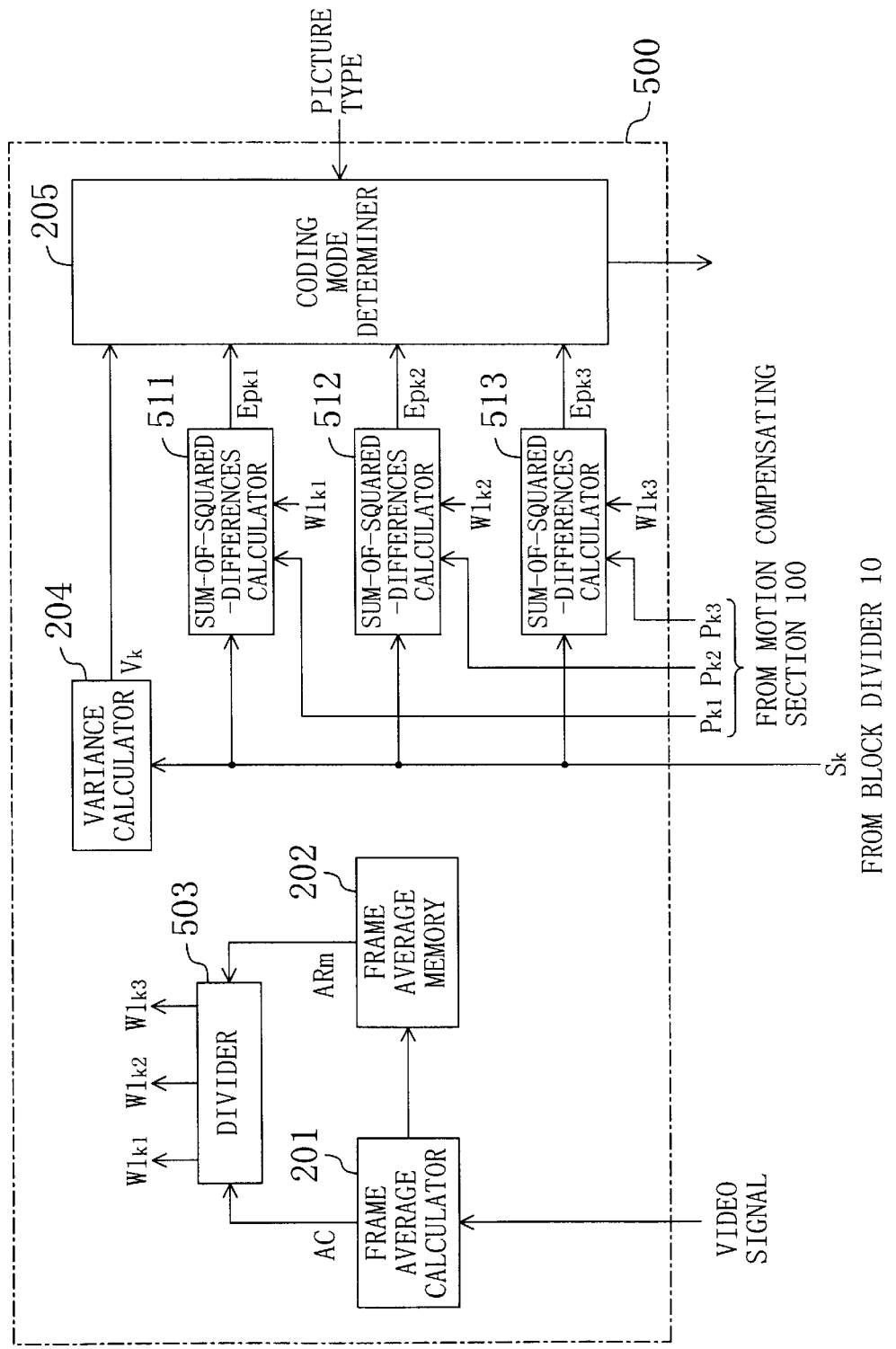
FIG. 8 is a block diagram illustrating a configuration of a coding mode determining section in a video coder according to a fourth embodiment of the present invention.

FIG. 8 is a block diagram illustrating a configuration for a coding mode determining section 500 according to a fourth exemplary embodiment of the present invention. The fourth embodiment is different from the first embodiment only by substituting the coding mode determining section 500 shown in FIG. 8 for the coding mode determining section 200 shown in FIG. 2, and the description of the other sections will be omitted herein.

As shown in FIG. 8, the coding mode determining section 500 includes: a frame average calculator 201; a frame average memory 202; a divider 503; a variance calculator 204, which is equivalent to the first calculating means as defined in the appended claims; a coding mode determiner 205; and a set of sum-of-squared-differences calculators 511, 512, 513, which are equivalent to the second calculating means as defined in the appended claims. The frame average calculator 201, frame average memory 202 and divider 503 together operate as the correction value calculating means as defined in the appended claims. The variance calculator 204 and coding mode determiner 205 are the same as the counterparts shown in FIG. 4, and the description thereof will be omitted herein.

In the following description, only the components associated with the forward prediction will be exemplified, because a similar principle is applicable to the backward or bidirectional prediction.

The frame average calculator 201 calculates an average AC of pixel values within the target frame, which has been input as a video signal. Then, the calculator 201 outputs the average to the frame average memory 202 and divider 503.

The frame average memory 202 stores thereon not only the average AC of pixel values within the target frame, but also an average of pixel values within a frame that was previously coded.

The divider 503 reads out an average $AR_1$ of pixel values within a reference frame for forward prediction from the frame average memory 202, obtains a ratio $W1_{k1}$ of the average $AR_1$ of pixel values within the reference frame to the average AC of pixel values within the target frame, and outputs the ratio as a correction value to the sum-of-squared-differences calculator 511. The ratio $W1_{k1}$ is given by $$W1_{km}=AR_m/AC \text{ (where } m=1, 2, 3)$$

Receiving the target block $S_k$, the predicted block $P_{k1}$ and the ratio $W1_{k1}$, the sum-of-squared-differences calculator 511 obtains a predicted error $Ep_{k1}$ by the following equation:

$$Ep_{km}=\Sigma_{i=1}^{n}(S_i*W1_{km}-P_{mi})^2 \text{ (where } m=1, 2, 3) \quad (7)$$

And the calculator 511 outputs the predicted error $Ep_{k1}$ to the coding mode determiner 205.

As represented by Equation (7), each pixel within the target block $S_k$ is weighted with the ratio $W1_{k1}$ such that the ratio of the average $AS'_k$ of pixel values within the corrected target block $S'_k$ to the average $AS_k$ of pixel values within the target block $S_k$ is equalized with the ratio of the average $AR_1$ of pixel values within the reference frame to the average AC of pixel values within the target frame. Then, the predicted error $Ep_{k1}$ is obtained as a sum of squared differences between the pixel values within the corrected target block $S'_k$ and the predicted block $P_{k1}$. In Equation (7), a sum of absolute differences may be derived instead of the sum of squared differences.

As to the backward and bidirectional predictions, the predicted errors $Ep_{k2}$ and $Ep_{k3}$ are obtained in similar manners and supplied to the coding mode determiner 205. The coding mode determiner 205 determines the coding mode based on the variance $V_k$ and the predicted errors $Ep_{k1}$, $Ep_{k2}$ and $Ep_{k3}$.

As described above, the video coder according to this embodiment corrects the pixel values within the target block $S_k$ with the ratio of the average $AR_1$, for example, of pixel values within the reference frame to the average AC of pixel values within the target frame, and obtains the predicted error $Ep_{k1}$, for example. Accordingly, even a part of the frame with a luminance signal level different from an average luminance signal level of the frame can be corrected in an optimized manner. As a result, it is possible to avoid selecting a coding mode with a predicted block generated by erroneous motion compensation.

In the foregoing embodiment, the pixel values within the block $S_k$ are corrected. Alternatively, the pixel values within the predicted block $P_{k1}$, for example, may be corrected instead.

Also, in this embodiment, an average of pixel values is stored on the frame average memory 202 on a frame-to-frame basis. Optionally, an average of pixel values within the reference frame may be derived again when required without using the frame average memory 202.

Embodiment 5

Figure 9:
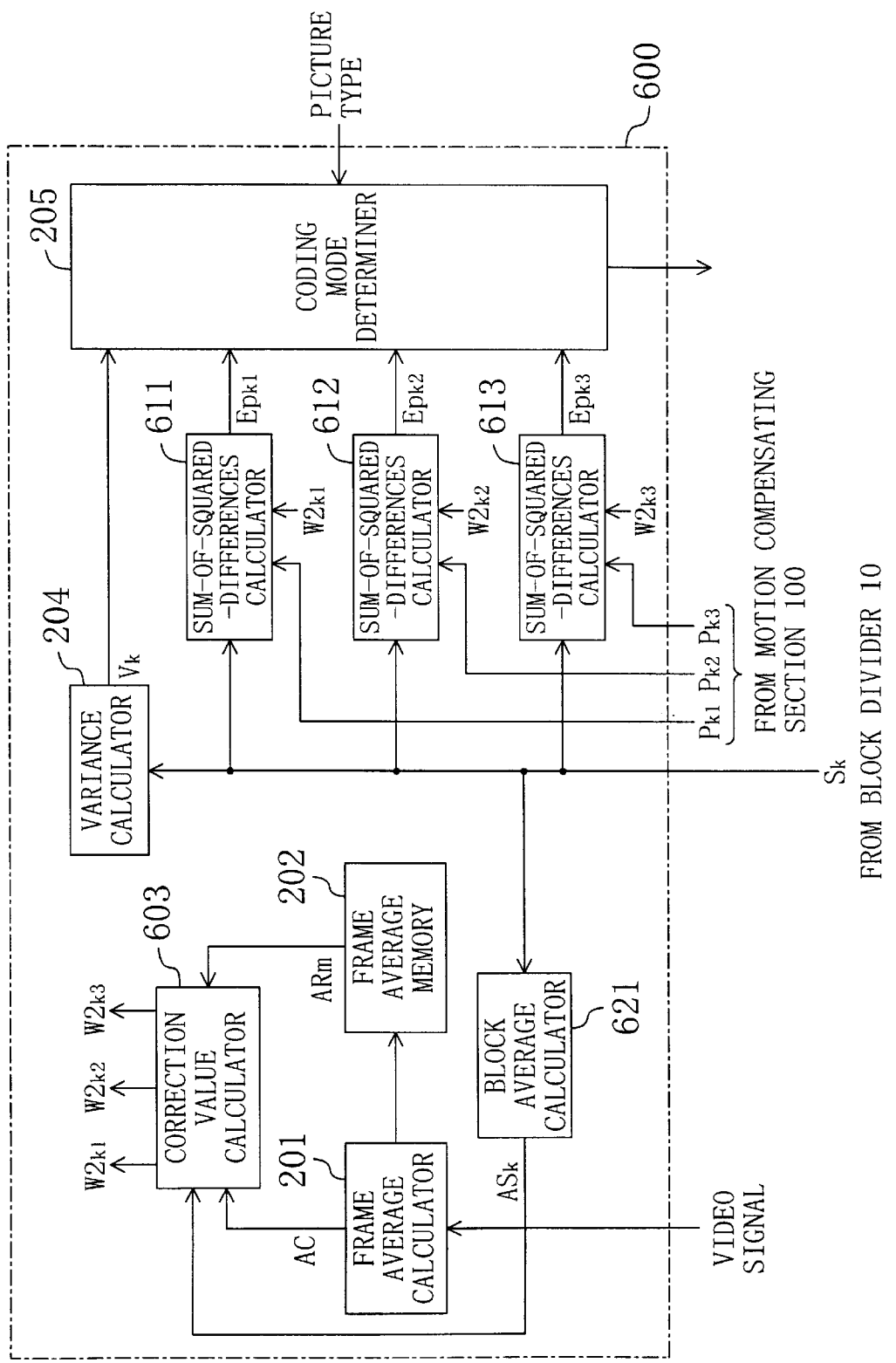
FIG. 9 is a block diagram illustrating a configuration of a coding mode determining section in a video coder according to a fifth embodiment of the present invention.

FIG. 9 is a block diagram illustrating a configuration for a coding mode determining section 600 according to a fifth exemplary embodiment of the present invention. The fifth embodiment is different from the first embodiment only by substituting the coding mode determining section 600 shown in FIG. 9 for the coding mode determining section 200 shown in FIG. 2, and the description of the other sections will be omitted herein.

As shown in FIG. 9, the coding mode determining section 600 includes: a frame average calculator 201; a frame average memory 202; a correction value calculator 603; a variance calculator 204, which is equivalent to the first calculating means as defined in the appended claims; a coding mode determiner 205; a set of sum-of-squared-differences calculators 611, 612, 613, which are equivalent to the second calculating means as defined in the appended claims; and a block average calculator 621. The frame average calculator 201, frame average memory 202 and correction value calculator 603 together operate as the correction value calculating means as defined in the appended claims. The variance calculator 204 and coding mode determiner 205 are the same as the counterparts shown in FIG. 4, and the description thereof will be omitted herein.

In the following description, only the components associated with the forward prediction will be exemplified, because a similar principle is applicable to the backward or bidirectional prediction.

The frame average calculator 201 calculates an average AC of pixel values within the target frame, which has been input as a video signal. Then, the calculator 201 outputs the average AC to the frame average memory 202 and correction value calculator 603.

The frame average memory 202 stores thereon not only the average AC of pixel values within the target frame, but also an average of pixel values within a frame that was previously coded.

The block average calculator 621 receives the target block $S_k$, calculates an average $AS_k$ of pixel values within the target block $S_k$, and outputs the average to the correction value calculator 603.

The correction value calculator 603 reads out an average $AR_1$ of pixel values within a reference frame for forward prediction from the frame average memory 202, obtains a correction value $W2_{k1}$, and outputs the correction value to the sum-of-squared-differences calculator 611. The correction value $W2_{k1}$ is given by $$W2_{km}=AS_k-AS'_{km}=(1-AR_m/AC)*AS_k \text{ (where } m=1, 2, 3)$$

where $AS'_{km}=AS_k*AR_m/AC$. The correction value $W1_{k1}$ is required to equalize the ratio of the average $AR_1$ of pixel values within the reference frame to the average AC of pixel values within the target frame with the ratio of the average $AS'_k$ of pixel values within the corrected target block $S'_k$ to the average $AS_k$ of pixel values within the target block $S_k$.

Receiving the target block $S_k$, the predicted block $P_{k1}$ and the correction value $W2_{k1}$, the sum-of-squared-differences calculator 611 obtains a predicted error $Ep_{k1}$ by the following equation:

$$Ep_{km} = \sum_{i=1}^{n} (s_i - p_{mi} - W2_{km})^2 \quad (8)$$
$$= \sum_{i=1}^{n} \{(s_i - W2_{km}) - p_{mi}\}^2 \text{ (where } m = 1, 2, 3)$$

And the calculator 611 outputs the predicted error $Ep_{k1}$ to the coding mode determiner 205.

As represented by Equation (8), the predicted error $Ep_{k1}$ is obtained by subtracting the correction value $W2_{km}$ from each pixel value within the target block $S_k$ and then by deriving a sum of squared differences between the pixel values within the corrected target block $S'_k$ and those within the predicted block $P_{k1}$. In Equation (8), a sum of absolute differences may be derived instead of the sum of squared differences.

As to the backward and bidirectional predictions, the predicted errors $Ep_{k2}$ and $Ep_{k3}$ are obtained in similar manners and input to the coding mode determiner 205. The coding mode determiner 205 determines the coding mode based on the variance $V_k$ and the predicted errors $Ep_k1$, $Ep_{k2}$ and $Ep_{k3}$.

As described above, the video coder according to this embodiment corrects the pixel values within the target block $S_k$ using the ratio of the average $AR_1$ of pixel values within the reference frame to the average AC of pixel values within the target frame, for example, and then obtains the predicted error $Ep_{k1}$, for example. Accordingly, the DC components can be matched with each other between the target block and the reference frame. That is to say, the effects of some special presentation such as fading can be eliminated. In addition, even when a part of the frame has a luminance signal level much deviated from an average luminance signal level of the frame, that part can be corrected in an optimized manner. Thus, it is possible to avoid selecting a coding mode with a predicted block generated by erroneous motion compensation.

According to the fifth embodiment, similar effects to those of the fourth embodiment can be attained, but the computational cost can be further cut down, because there is no need to perform multiplication on each pixel.

In the foregoing embodiment, the pixel values within the target block $S_k$ are corrected. Alternatively, the pixel values within the predicted block $P_{k1}$ may be corrected instead.

Also, in this embodiment, an average of pixel values is stored on the frame average memory 202 on a frame-to-frame basis. Optionally, an average of pixel values within the reference frame may be derived again when required without using the frame average memory 202.

Embodiment 6

Figure 10:
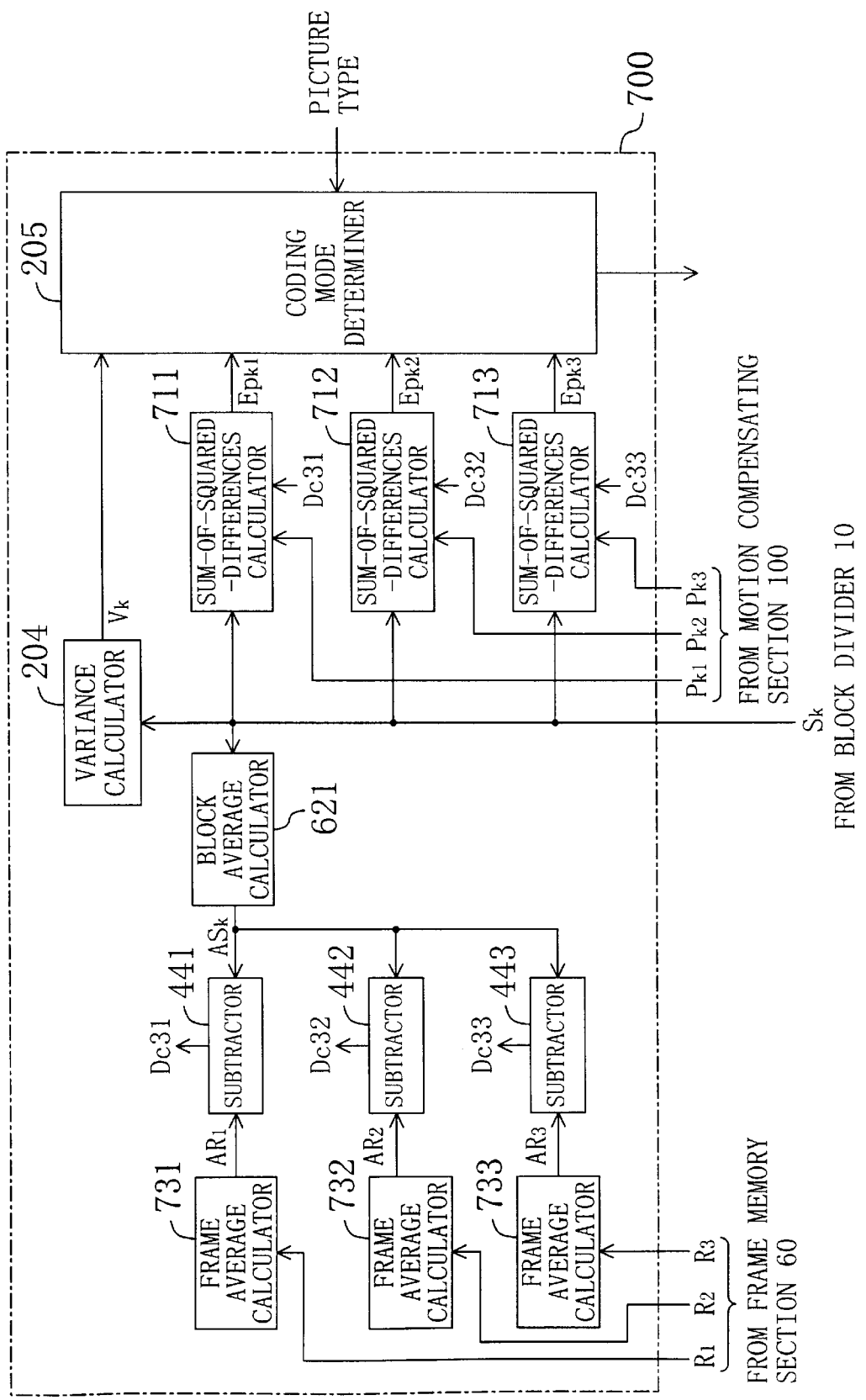
FIG. 10 is a block diagram illustrating a configuration of a coding mode determining section in a video coder according to a sixth embodiment of the present invention.

FIG. 10 is a block diagram illustrating a configuration for a coding mode determining section 700 according to a sixth exemplary embodiment of the present invention. The sixth embodiment is different from the first embodiment only by substituting the coding mode determining section 700 shown in FIG. 10 for the coding mode determining section 200 shown in FIG. 2, and the description of the other sections will be omitted herein.

As shown in FIG. 10, the coding mode determining section 700 includes: a block average calculator 621; a set of frame average calculators 731, 732, 733; a set of subtracters 441, 442, 443; a variance calculator 204, which is equivalent to the first calculating means as defined in the appended claims; a coding mode determiner 205; and a set of sum-of-squared-differences calculators 711, 712, 713, which are equivalent to the second calculating means as defined in the appended claims. The block average calculator 621, frame average calculators 731, 732, 733 and subtracters 441, 442, 443 together operate as the correction value calculating means as defined in the appended claims. The variance calculator 204 and coding mode determiner 205 are the same as the counterparts shown in FIG. 4, and the description thereof will be omitted herein.

In the following description, only the components associated with the forward prediction will be exemplified, because a similar principle is applicable to the backward or bidirectional prediction.

The block average calculator 621 receives the target block $S_k$, calculates an average $AS_k$ of pixel values within the target block $S_k$ and outputs the average $AS_k$ to the subtracter 441.

The frame average calculator 731 receives a reference frame $R_1$ used for forward prediction from the frame memory section 60, calculates an average $AR_1$ of pixel values within the reference frame $R_1$ and outputs the average $AR_1$ to the subtracter 441.

The subtracter 441 receives not only the average $AS_k$ of pixel values within the target block $S_k$, but also the average $AR_1$ of pixel values within the reference frame $R_1$, obtains a difference Dc31 and outputs the difference as a correction value to the sum-of-squared-differences calculator 711. The difference Dc31 is given by $$Dc3m = AS_k - AR_m \ (m=1, 2, 3)$$

That is to say, the difference Dc31 represents an increase in average $AS_k$ of pixel values within the target block $S_k$ over the average $AR_1$ of pixel values within the reference frame $R_1$.

Receiving the target block $S_k$, the predicted block $P_{k1}$ and the difference Dc31, the sum-of-squared-differences calculator 711 obtains a predicted error $Ep_{k1}$ by the following equation:

$$Ep_{km} = \sum_{i=1}^{n} (s_i - p_{mi} - Dc3m)^2 \qquad (9)$$

$$= \sum_{i=1}^{n} \{(s_i - Dc3m) - p_{mi}\}^2 \ \text{(where } m = 1, 2, 3\text{)}$$

And the calculator 711 outputs the predicted error $Ep_{k1}$ to the coding mode determiner 205.

As represented by Equation (9), the predicted error $Ep_{k1}$ can be obtained as a sum of squared differences, each representing a difference between each pixel value within the target block $S_k$ minus the difference Dc31 and an associated pixel value within the predicted block $P_{k1}$. In Equation (9), a sum of absolute differences may be derived instead of the sum of squared differences.

As to the backward and bidirectional predictions, the predicted errors $Ep_{k2}$ and $Ep_{k3}$ are obtained in similar manners and input to the coding mode determiner 205. The coding mode determiner 205 determines the coding mode based on the variance $V_k$ and the predicted errors $Ep_{k1}$, $Ep_{k2}$ and $Ep_{k3}$.

As described above, the video coder according to this embodiment obtains such a correction value for each target block $S_k$ as equalizing the average $AS_k$ of pixel values within the target block $S_k$ with the average $AR_1$ of pixel values within the reference frame $R_1$, for example, corrects each pixel value within the target block $S_k$ with the correction value, and then obtains the predicted error $Ep_{k1}$. Thus, the effects of some special presentation such as fading can be eliminated. In addition, even when a part of the frame has a luminance signal level much deviated from an average luminance signal level of the frame, that part can be corrected in an optimized manner. As a result, it is possible to avoid selecting a coding mode with a predicted block generated by erroneous motion compensation.

According to the sixth embodiment, the same effects as those attained by the fourth and fifth embodiments are also attainable. In addition, the circuit configuration can be further simplified according to this embodiment, because the correction is realized only by obtaining a sum.

In the foregoing embodiment, the pixel values within the target block $S_k$ are corrected. Alternatively, the pixel values within the predicted block $P_{k1}$ may be corrected, for example.

Embodiment 7

Figure 11:
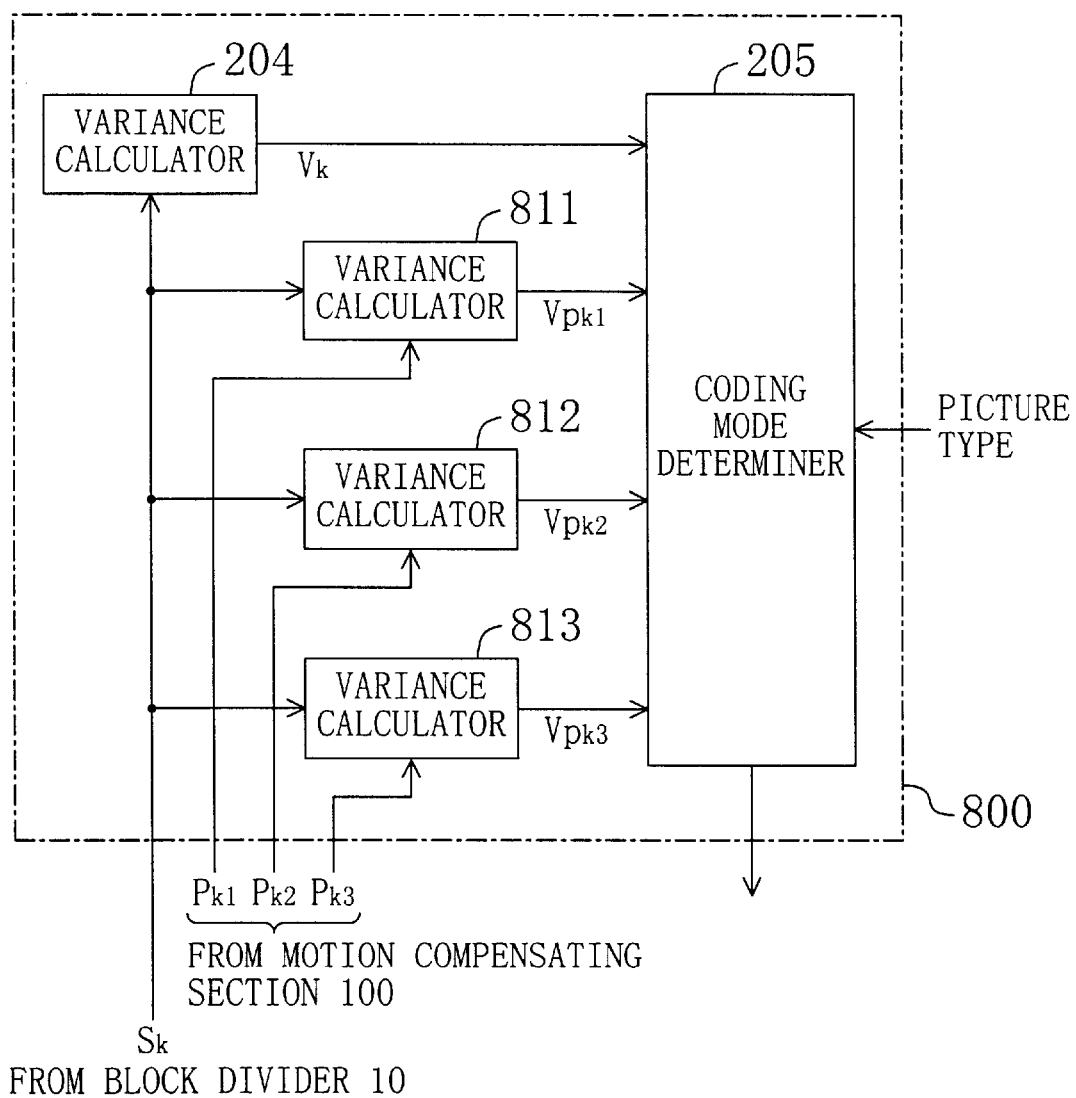
FIG. 11 is a block diagram illustrating a configuration of a coding mode determining section in a video coder according to a seventh embodiment of the present invention.

FIG. 11 is a block diagram illustrating a configuration for a coding mode determining section 800 according to a seventh exemplary embodiment of the present invention. The seventh embodiment is different from the first embodiment only by substituting the coding mode determining section 800 shown in FIG. 11 for the coding mode determining section 200 shown in FIG. 2, and the description of the other sections will be omitted herein.

As shown in FIG. 11, the coding mode determining section 800 includes a variance calculator 204, which is equivalent to the first calculating means as defined in the appended claims; a set of variance calculators 811, 812, 813, which are equivalent to the second calculating means as defined in the appended claims; and a coding mode determiner 205. The variance calculator 204 and coding mode determiner 205 are the same as the counterparts shown in FIG. 4, and the description thereof will be omitted herein.

In the following description, only the components associated with the forward prediction will be exemplified, because a similar principle is applicable to the backward or bidirectional prediction.

Receiving the target block $S_k$ and the predicted block $P_{k1}$, the variance calculator 811 calculates the variance $Vp_{k1}$ of the predicted error block $P'_{k1}$, and outputs the variance as an estimate of the predicted error block $P'_{k1}$ to the coding mode determiner 205. The variance $Vp_{k1}$ is given by:

$$Vp_{km} = \Sigma_{i=1}^{n} (p'_{mi} - AP'_{km})^2 \text{ (where } m=1, 2, 3) \tag{10}$$

where $AP'_{km}$ is an average of pixel values within the predicted error block $P'_{km}$.

The predicted error block $P'_{k1}$ is a block representing a difference obtained by subtracting the predicted block $P_{k1}$ from the target block $S_k$. Thus, Equation (10) is equivalent to obtaining a predicted error of the target block $S_k$ by subtracting the average $AP'_{km}$ of pixel values within the predicted error block from the counterpart of the target block $S_k$.

As to the backward and bidirectional predictions, the variances $Vp_{k2}$ and $Vp_{k3}$ are obtained in similar manners and input to the coding mode determiner 205. The coding mode determiner 205 determines the coding mode based on the variances $V_k$, $Vp_{k1}$, $Vp_{k2}$ and $Vp_{k3}$.

The coding mode is determined in the same way as in the first embodiment, except that the variances $Vp_{k1}$, $Vp_{k2}$ and $Vp_{k3}$ are used instead of the predicted errors $Ep_{k1}$, $Ep_{k2}$ and $Ep_{k3}$. For example, if a B-picture has been specified, the coding mode determiner 205 compares the variances $V_k$, $Vp_{k1}$, $Vp_{k2}$ and $Vp_{k3}$ to each other and determines the coding mode based on the result thereof. Specifically, if the variance $V_k$ turns out to be the smallest, then the determiner 205 selects an intra-frame-coding mode. On the other hand, if the variance $Vp_{k1}$ turns out to be the smallest, then the determiner 205 selects a forward prediction mode.

As described above, the video coder according to this embodiment obtains a variance of the predicted error block $P'_{k1}$ for example, and determines the coding mode based on the variance obtained. To obtain the variance is equivalent to matching the values of DC components between the target block $S_k$ and the predicted block $P_{k1}$, for example. Thus, the same effects as those attained by the first through sixth embodiments are also attainable according to this embodiment for a fading picture, for example.

Also, the coding mode may be selectively determined by using either the AC components only as in the first through seventh embodiments or the input video signal as it is like a conventional method. Such a selection may be carried out based on a result of fading detection, for instance.

In the foregoing first through seventh embodiments, the number of coding mode types is supposed to be four. Alternatively, any arbitrary number of coding mode types may be prepared in advance.

Embodiment 8

In the following description, various embodiments of a video coder including a motion compensating section, which can correctly compensate for even the motion of a fading picture, will be described.

Figure 12:
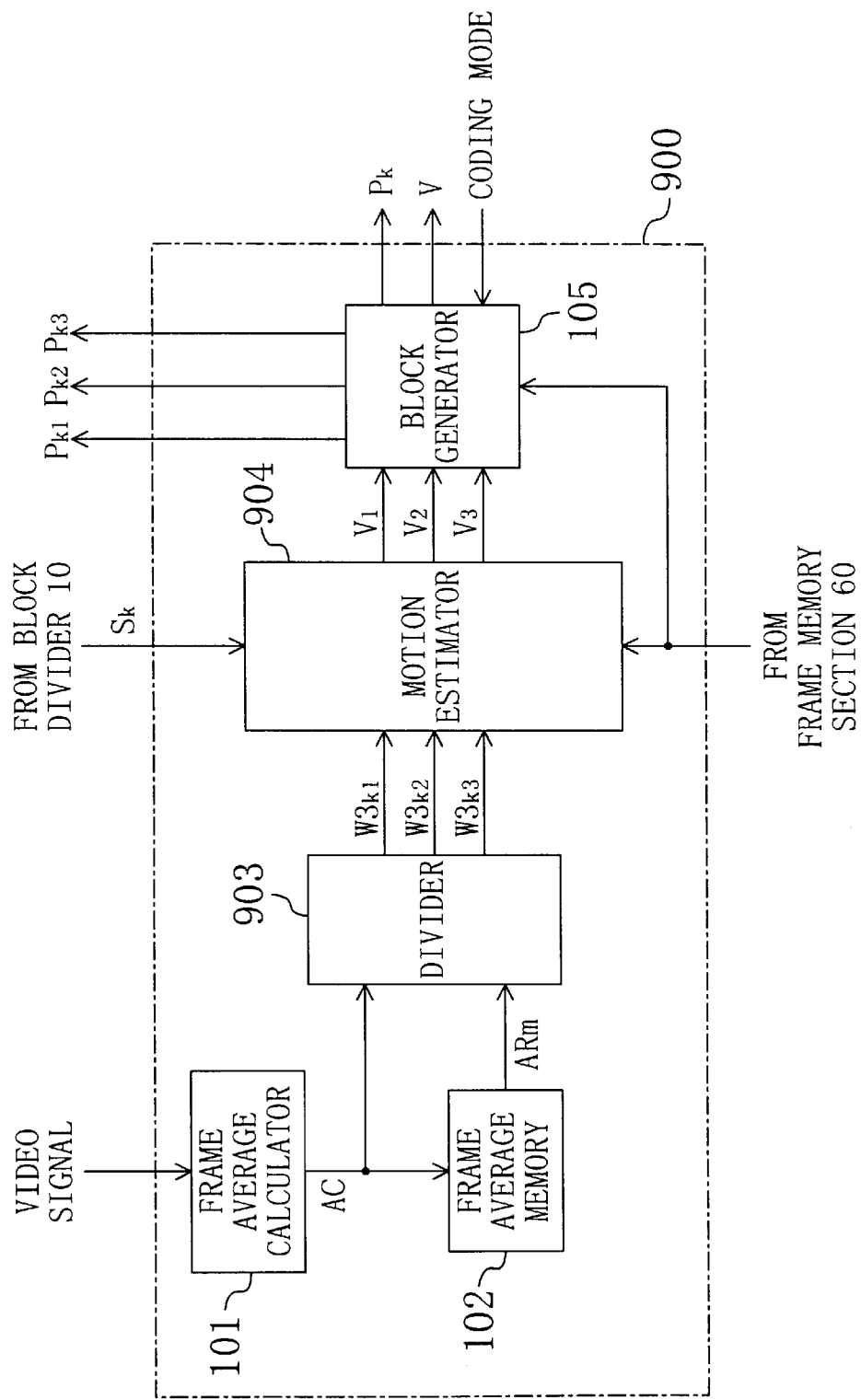
FIG. 12 is a block diagram illustrating a configuration of a motion compensating section in a video coder according to an eighth embodiment of the present invention.

FIG. 12 is a block diagram illustrating a configuration of a motion compensating section 900 for a video coder according to an eighth exemplary embodiment of the present invention. The eighth embodiment is different from the first embodiment only by substituting the motion compensating section 900 shown in FIG. 12 for the motion compensating section 100 shown in FIG. 2, and the description of the other sections will be omitted herein.

As shown in FIG. 12, the motion compensating section 900 includes: a frame average calculator 101; a frame average memory 102; a divider 903; a motion estimator 904; and a block generator 105. The frame average calculator 101, frame average age memory 102 and divider 903 together operate as the correction value calculating means as defined in the appended claims.

The block generator 105 is the same as that illustrated in FIG. 3, and the description thereof will be omitted herein.

In the following description, only the components associated with the forward prediction will be exemplified, because a similar principle is applicable to the backward or bidirectional prediction.

The frame average calculator 101 calculates an average AC of pixel values within the target frame, which has been input as a video signal. Then, the calculator 101 outputs the average to the frame average memory 102 and divider 903.

The frame average memory 102 stores thereon not only the average AC of pixel values within the target frame, but also an average of pixel values within a frame that was previously coded.

The divider 903 reads out an average $AR_1$ of pixel values within a reference frame for forward prediction from the frame average memory 102, obtains a ratio $W3_{k1}$ of the average $AR_1$ of pixel values within the reference frame to the average AC of pixel values within the target frame, and outputs the ratio as a correction value to the motion estimator 904. The ratio $W3^{kg}$ is given by $$W3_{km} = AR_m / AC \text{ (where } m=1, 2, 3)$$

Receiving the target block $S_k$, pixel data within the search range of the reference frame stored on the frame memory section 60 and the ratios $W3_{k1}$, $W3_{k2}$ and $W3_{k3}$ the motion estimator 904 estimates motion vectors $V_1$, $V_2$ and $V_3$ corresponding to respective prediction modes and outputs them to the block generator 105.

For example, the motion estimator 904 obtains an estimate $Eb_{k1}$ by the following equation:

$$Eb_{km} = \Sigma_{i=1}^{n} |S_i * W3_{km} - b_{mi}| \text{ (where } m=1, 2, 3) \tag{11}$$

and evaluates a correlation between a candidate block $B_{k1} = \{b_{11}, b_{12}, \ldots, b_{1i}, \ldots, b_{1n}\}$ within the search range and the target block $S_k$. The motion estimator 904 outputs, as the motion vector $V_1$, a quantity representing distance and direction from a block $B_{k1}$ with the smallest estimate $Eb_{k1}$ to the target block $S_k$.

The equation for deriving the estimate $Eb_{k1}$ may be modified in any arbitrary manner so long as the correlation between the candidate block $B_{k1}$ within the search range and the target block $S_k$ can be obtained. For example, the following Equation (12) may also be used:

$$Eb_{km} = \sum_{i=1}^{n}(S_i * W3_{km} - b_{mi})^2 \text{ (where } m=1, 2, 3) \quad (12)$$

As represented by Equations (11) and (12), each pixel within the target block $S_k$ is weighted with the ratio $W3_{k1}$ such that the ratio of the average $AS'_k$ of pixel values within the corrected target block $S'_k$ to the average $AS_k$ of pixel values within the target block $S_k$ is equalized with the ratio of the average $AR_1$ of pixel values within the reference frame to the average $AC$ of pixel values within the target frame. Then, the estimate $Eb_{k1}$ is obtained as a sum of squared differences between the pixel values within the corrected target block $S'_k$ and the candidate block $B_{k1}$ within the search range.

As to the backward and bidirectional predictions, the motion estimator 904 obtains the motion vectors $V_2$ and $V_3$ in similar manners and outputs them to the block generator 105.

As described above, the video coder according to this embodiment corrects the pixel values within the target block $S_k$ using the ratio of the average $AR_1$ of pixel values within the reference frame to the average $AC$ of pixel values within the target frame, and then obtains the motion vector $V_1$, for example. Accordingly, even when a part of the frame has a luminance signal level much deviated from an average luminance signal level of the frame, that part can be corrected in an optimized manner. Thus, it is possible to avoid estimating an erroneous motion vector.

In this embodiment, the pixel values within the target block $S_k$ are corrected. Alternatively, the pixel values within the candidate block $B_{k1}$ in the search range may be corrected instead.

Also, in this embodiment, an average of pixel values is stored on the frame average memory 102 on a frame-to-frame basis. Optionally, an average of pixel values within the reference frame may be derived again when required without using the frame average memory 102.

Embodiment 9

Figure 13:
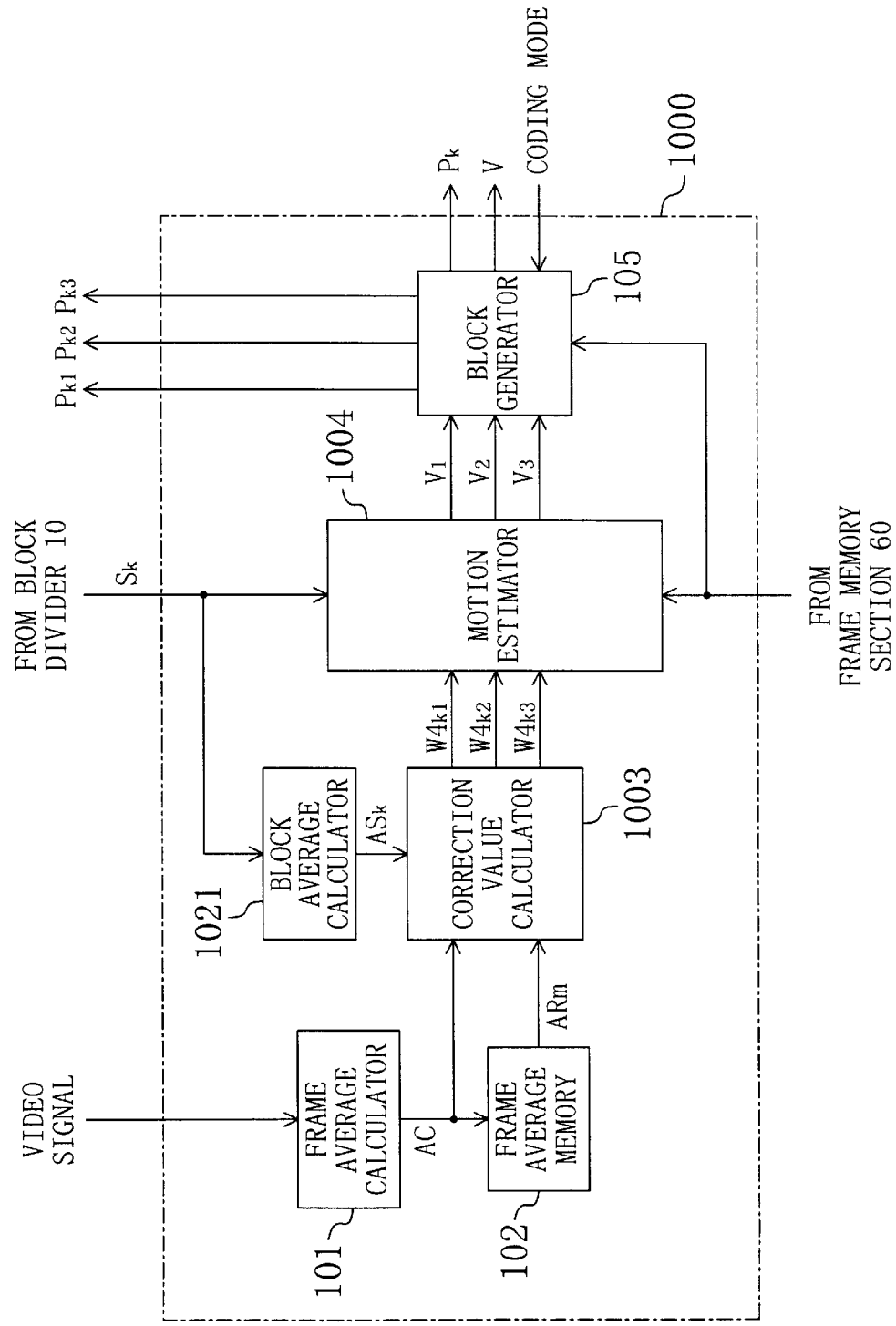
FIG. 13 is a block diagram illustrating a configuration of a motion compensating section in a video coder according to a ninth embodiment of the present invention.

FIG. 13 is a block diagram illustrating a configuration of a motion compensating section 1000 for a video coder according to a ninth exemplary embodiment of the present invention. The ninth embodiment is different from the first embodiment only by substituting the motion compensating section 1000 shown in FIG. 13 for the motion compensating section 100 shown in FIG. 2, and the description of the other sections will be omitted herein.

As shown in FIG. 13, the motion compensating section 1000 includes: a frame average calculator 101; a frame average memory 102; a correction value calculator 1003; a motion estimator 1004; a block generator 105; and a block average calculator 1021. The frame average calculator 101, frame average memory 102, correction value calculator 1003 and block average calculator 1021 together operate as the correction value calculating means as defined in the appended claims. The block generator 105 is the same as that illustrated in FIG. 3, and the description thereof will be omitted herein.

In the following description, only the components associated with the forward prediction will be exemplified, because a similar principle is applicable to the backward or bidirectional prediction.

The frame average calculator 101 calculates an average $AC$ of pixel values within the target frame, which has been input as a video signal. Then, the calculator 101 outputs the average to the frame average memory 102 and correction value calculator 1003.

The frame average memory 102 stores thereon not only the average $AC$ of pixel values within the target frame, but also an average of pixel values within a frame that was previously coded.

The block average calculator 1021 receives the target block $S_k$, calculates an average $AS_k$ of pixel values within the target block $S_k$ and outputs the average $AS_k$ to the correction value calculator 1003.

The correction value calculator 1003 reads out an average $AR_1$ of pixel values within a reference frame for forward prediction from the frame average memory 102, obtains a correction value $W4_{k1}$, and outputs the correction value to the motion estimator 1004. The correction value $W4_{k1}$ is given by $$W4_{km} = AS_k - AS'_{km} = (1 - AR_m/AC) * AS_k \text{ (where } m=1, 2, 3)$$

where $AS'_{km} = AS_k * AR_m / AC$. The correction value $W4_{k1}$ is required to equalize the ratio of the average $AR_1$ of pixel values within the reference frame to the average $AC$ of pixel values within the target frame with the ratio of the average $AS'_k$ of pixel values within the corrected target block $S'_k$ to the average $AS_k$ of pixel values within the target block $S_k$.

Receiving the target block $S_k$, pixel data within the search range of the reference frame stored on the frame memory section 60 and the ratios $W4_{k1}$, $W4_{k2}$ and $W4_{k1}$ the motion estimator 1004 estimates motion vectors $V_1$, $V_2$ and $V_3$ corresponding to respective prediction modes and outputs them to the block generator 105.

For example, the motion estimator 1004 obtains an estimate $Eb_{k1}$ by the following equation:

$$Eb_{km} = \sum_{i=1}^{n} |s_i - b_{mi} - W4_{km}| \quad (13)$$

$$= \sum_{i=1}^{n} |(s_i - W4_{km}) - b_{mi}| \text{ (where } m = 1, 2, 3)$$

and evaluates a correlation between a candidate block $B_{k1} = \{b_{11}, b_{12}, \ldots, b_{1i}, \ldots, b_{1n}\}$ within the search range and the target block $S_k$. The motion estimator 1004 outputs, as the motion vector $V_1$, a quantity representing distance and direction from a candidate block $B_{k1}$ with the smallest estimate $Eb_{k1}$ (among a plurality of candidate blocks $B_{k1}$ moved within the search range) to the target block $S_k$.

The equation for deriving the estimate $Eb_{k1}$ may be modified in any arbitrary manner so long as the correlation between the candidate block $B_{k1}$ within the search range and the target block $S_k$ can be obtained. For example, the following Equation (14) may also be used:

$$Eb_{km} = \sum_{i=1}^{n} (s_i - b_{mi} - W4_{km})^2 \quad (14)$$

$$= \sum_{i=1}^{n} \{(s_i - W4_{km}) - b_{mi}\}^2 \text{ (where } m = 1, 2, 3)$$

As represented by Equations (13) and (14), the estimate $Eb_{k1}$ is obtained by subtracting the correction value $W4_{k1}$ from each pixel value within the target block $S_k$ and then by deriving a sum of differences between the pixel values within the corrected target block $S'_k$ and those within the candidate block $B_{k1}$ in the search range.

As to the backward and bidirectional predictions, the motion estimator 1004 obtains the motion vectors $V_2$ and $V_3$ in similar manners and outputs them to the block generator 105.

As described above, the video coder according to this embodiment corrects the pixel values within the target block $S_k$ using the ratio of the average $AR_1$ of pixel values within the reference frame to the average AC of pixel values within the target frame, and then obtains the motion vector $V_1$, for example. Accordingly, the DC components can be matched with each other between the target block and the reference frame. That is to say, the effects of some special presentation such as fading can be eliminated. In addition, even when a part of the frame has a luminance signal level much deviated from an average luminance signal level of the frame, that part can be corrected in an optimized manner. Thus, it is possible to avoid estimating an erroneous motion vector.

According to the ninth embodiment, similar effects to those of the eighth embodiment can be attained, but the computational cost can be further cut down, because there is no need to perform multiplication on each pixel.

In the foregoing embodiment, the pixel values within the target block $S_k$ are corrected. Alternatively, the pixel values within the candidate block Bal. In the search range may be corrected instead.

Also, in this embodiment, an average of pixel values is stored on the frame average memory 102 on a frame-to-frame basis. Optionally, an average of pixel values within the reference frame may be derived again when required without using the frame average memory 102.

Embodiment 10

Figure 14:
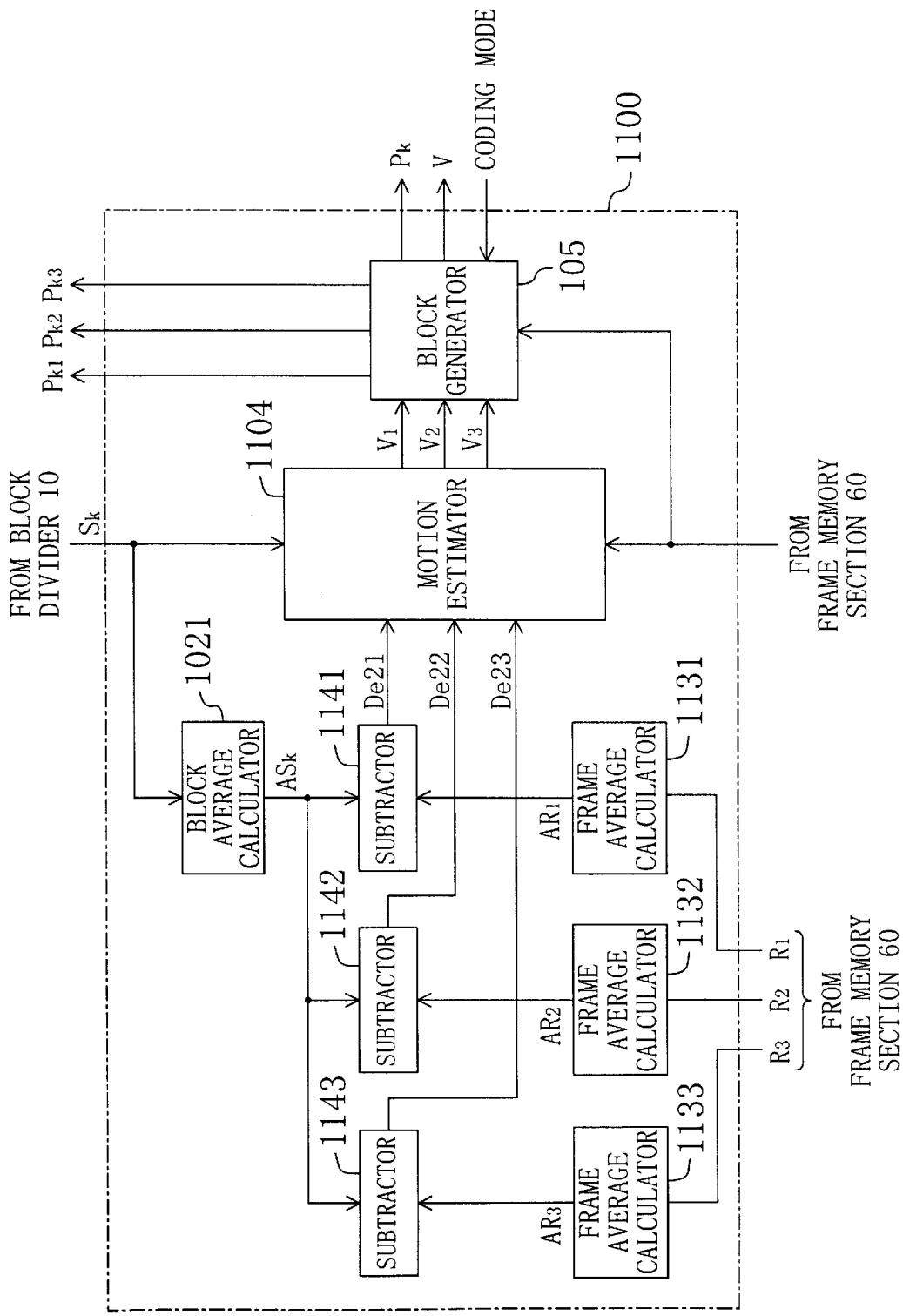
FIG. 14 is a block diagram illustrating a configuration of a motion compensating section in a video coder according to a tenth embodiment of the present invention.

FIG. 14 is a block diagram illustrating a configuration of a motion compensating section 1100 for a video coder according to a tenth exemplary embodiment of the present invention. The tenth embodiment is different from the first embodiment only by substituting the motion compensating section 1100 shown in FIG. 14 for the motion compensating section 100 shown in FIG. 2, and the description of the other sections will be omitted herein.

As shown in FIG. 14, the motion compensating section 1100 includes: a motion estimator 1104; a block generator 105; a block average calculator 1021; a set of frame average calculators 1131, 1132, 1133; and a set of subtracters 1141, 1142, 1143. The block average calculator 1021, frame average calculators 1131, 1132, 1133 and subtracters 1141, 1142, 1143 together operate as the correction value calculating means as defined in the appended claims. The block generator 105 is the same as that illustrated in FIG. 3, and the description thereof will be omitted herein.

In the following description, only the components associated with the forward prediction will be exemplified, because a similar principle is applicable to the backward or bidirectional prediction.

The block average calculator 1021 receives the target block $S_k$, calculates an average $AS_k$ of pixel values within the target block $S_k$ and outputs the average $AS_k$ to the subtracter 1141.

The frame average calculator 1131 receives the reference frame $R_1$ used for forward prediction from the frame memory section 60, calculates an average $AR_1$ of pixel values within the reference frame $R_1$, and then outputs the average $AR_1$ to the subtracter 1141.

The subtracter 1141 receives not only the average $AS_k$ of pixel values within the target block $S_k$, but also the average $AR_1$ of pixel values within the reference frame $R_1$, obtains a difference De21 and outputs the difference as a correction value to the motion estimator 1104. The difference De21 is given by $$De2m = AS_k - AR_m \quad (m=1, 2, 3)$$

That is to say, the difference De21 represents an increase in average $AS_k$ of pixel values within the target block $S_k$ over the average $AR_1$ of pixel values within the reference frame $R_1$.

Receiving the target block $S_k$, pixel data within the search range of the reference frame stored on the frame memory section 60 and the differences De21, De22 and De23, the motion estimator 1104 estimates motion vectors $V_1$, $V_2$ and $V_3$ corresponding to respective prediction modes and outputs them to the block generator 105.

For example, the motion estimator 1104 obtains an estimate $Eb_{k1}$ by the following equation:

$$Eb_{km} = \sum_{i=1}^{n} |s_i - b_{mi} - De2m| \qquad (15)$$

$$= \sum_{i=1}^{n} |(s_i - De2m) - b_{mi}| \text{ (where } m = 1, 2, 3\text{)}$$

and evaluates a correlation between a candidate block $B_{k1} = \{b_{11}, b_{12}, \ldots, b_{1i}, \ldots, b_{1n}\}$ within the search range and the target block $S_k$. The motion estimator 1104 outputs, as the motion vector $V_1$, a quantity representing distance and direction from a candidate block with the smallest estimate $Eb_{k1}$ (among a plurality of candidate blocks $B_{k1}$ moved within the search range) to the target block $S_k$.

The equation for deriving the estimate $Eb_{k1}$ may be modified in any arbitrary manner so long as the correlation between the candidate block $B_{k1}$ within the search range and the target block $S_k$ can be obtained. For example, the following Equation (16) may also be used:

$$Eb_{km} = \sum_{i=1}^{n} (s_i - b_{mi} - De2m)^2 \qquad (16)$$

$$= \sum_{i=1}^{n} \{(s_i - De2m) - b_{mi}\}^2 \text{ (where } m = 1, 2, 3\text{)}$$

As represented by Equations (15) and (16), the estimate $Eb_{k1}$ is obtained by subtracting the correction value De21 from each pixel value within the target block $S_k$ and then by deriving a sum of differences between the pixel values within the corrected target block $S'_k$ and those within the candidate block $B_{k1}$ in the search range.

As to the backward and bidirectional predictions, the motion estimator 1104 obtains the motion vectors $V_2$ and $V_3$ in similar manners and outputs them to the block generator 105.

As described above, the video coder according to this embodiment obtains such a correction value for each target block $S_k$ as equalizing the average $AS_k$ of pixel values within the target block $S_k$ with the average $AR_1$ of pixel values within the reference frame $R_1$, for example, corrects the pixel values within the target block $S_k$ using the correction value and then obtains the motion vector $V_1$, for example. Thus, the effects of some special presentation such as fading can be eliminated. In addition, even when a part of the frame has a luminance signal level much deviated from an average luminance signal level of the frame, that part can be corrected in an optimized manner. As a result, it is possible to avoid estimating an erroneous motion vector. According to the tenth embodiment, the same effects as those attained by the eighth and ninth embodiments are also attainable. In addition, the circuit configuration can be further simplified according to this embodiment, because the correction is realized only by obtaining a sum.

In the foregoing embodiment, the pixel values within the target block $S_k$ are corrected. Alternatively, the pixel values within the candidate block $B_{k1}$ in the search range may be corrected, for example.

Embodiment 11

Figure 15:
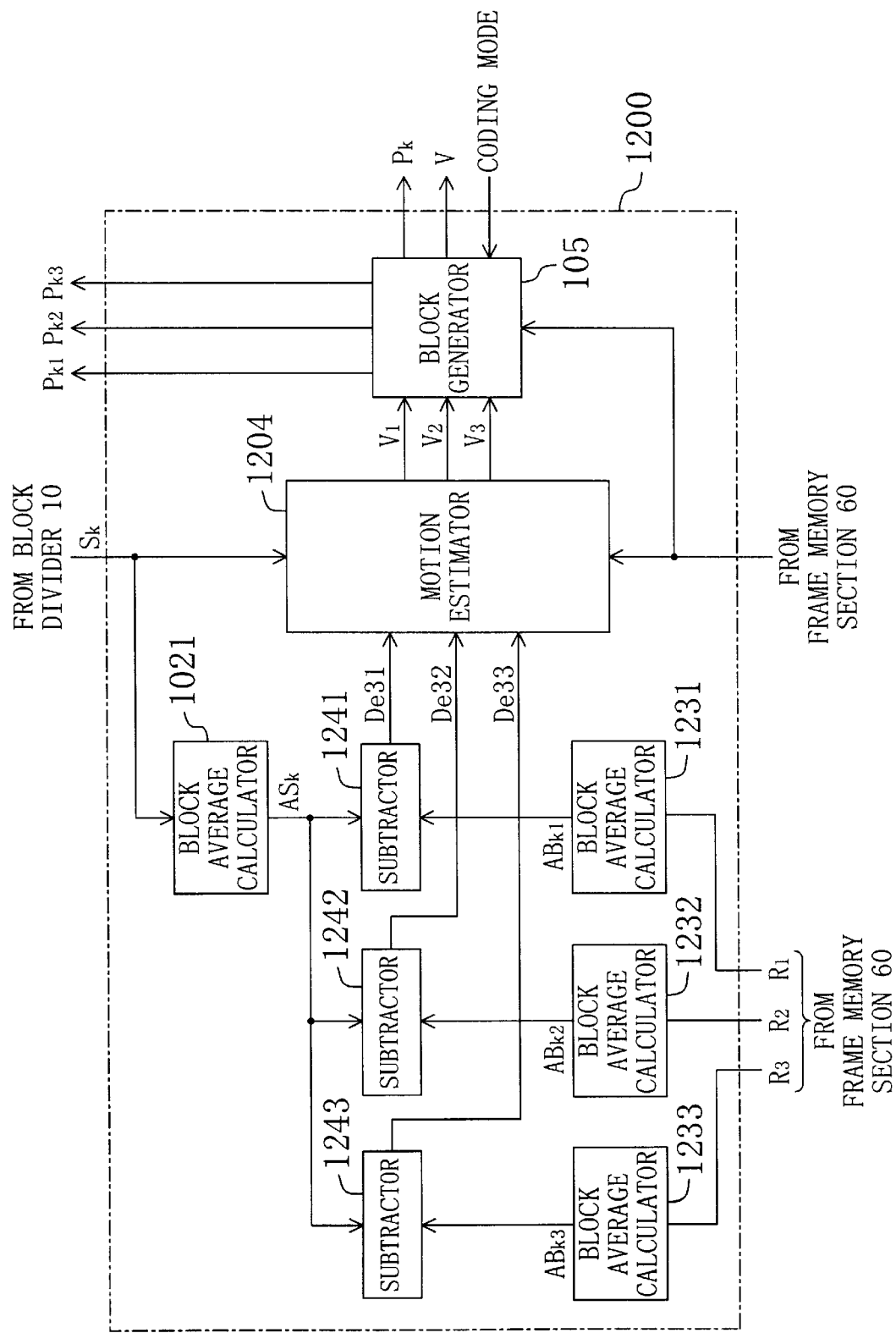
FIG. 15 is a block diagram illustrating a configuration of a motion compensating section in a video coder according to an eleventh embodiment of the present invention.
Figure 16:
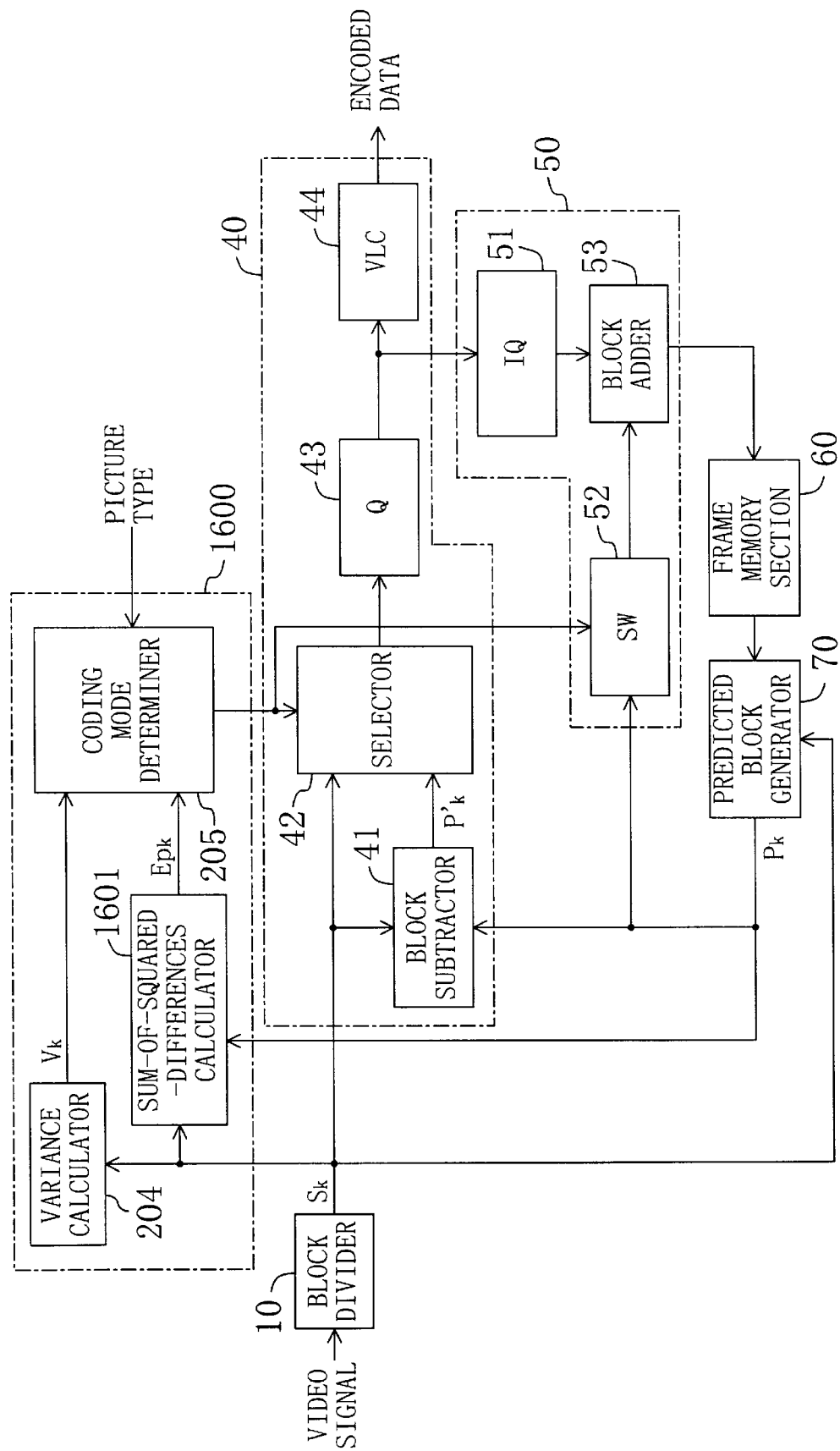
FIG. 16 is a block diagram illustrating a configuration of a conventional video coder.
Figure 17:
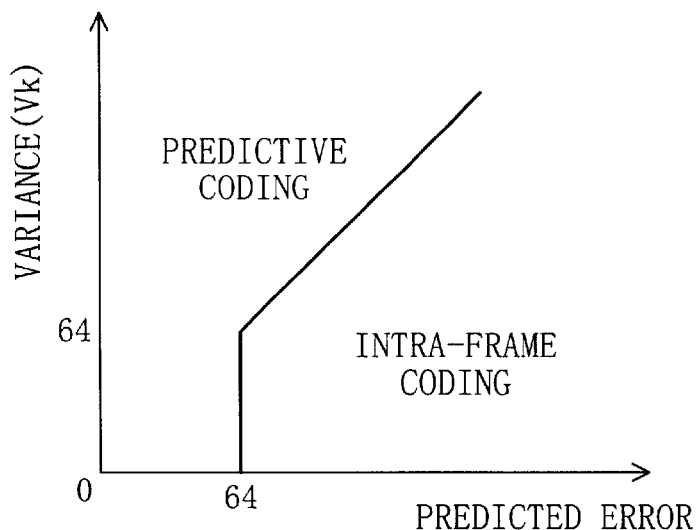
FIG. 17 is a diagram illustrating how a coding mode is determined by a TM technique according to the MPEG standards.
Figure 18:
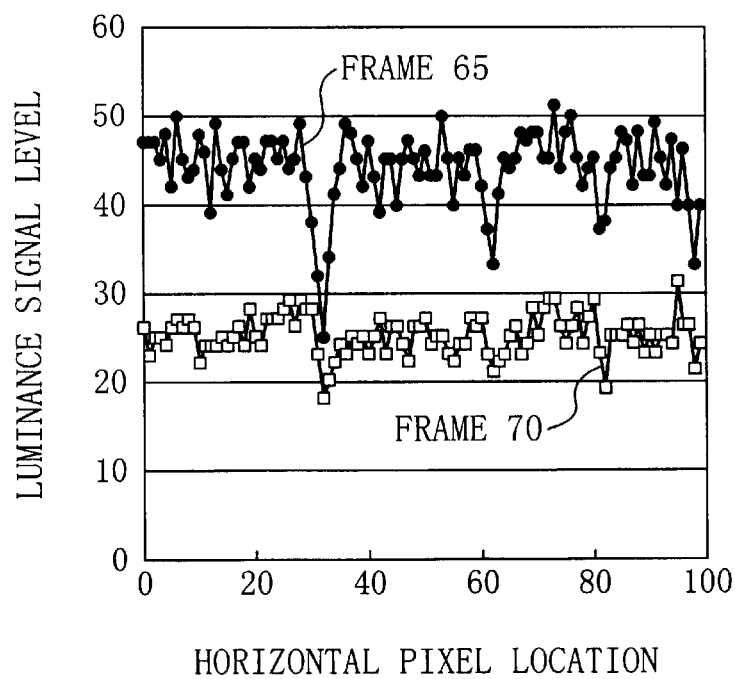
FIG. 18 is a graph illustrating how the luminance signal level of a pixel on the same line changes in discrete frames with the passage of time.
Figure 19A:
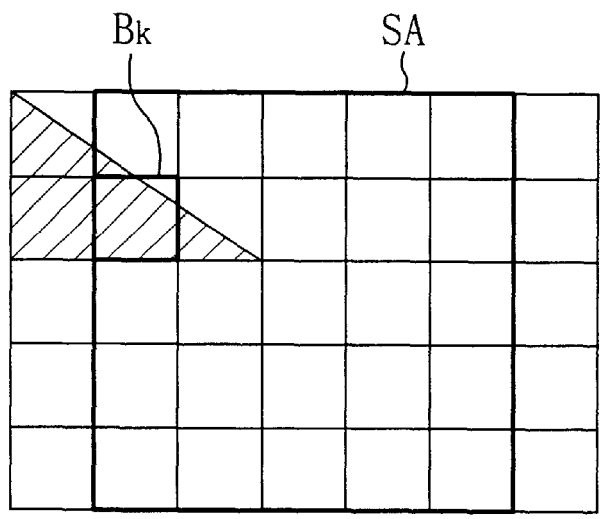
FIGS. 19A, 19B and 19C illustrate a problem arising in a fading picture.
Figure 19B:
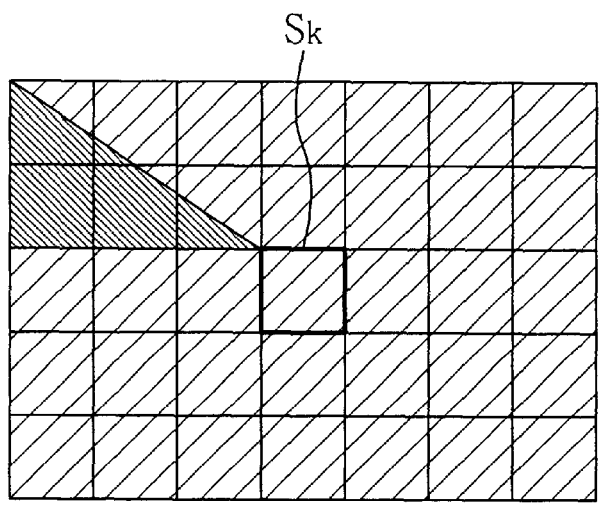
Figure 19C:
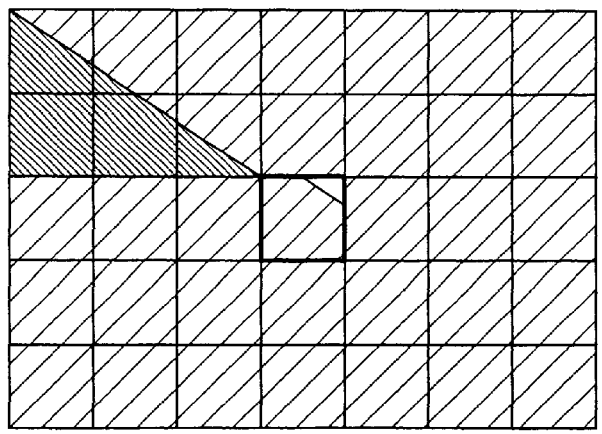

FIG. 15 is a block diagram illustrating a configuration of a motion compensating section 1200 for a video coder according to an eleventh exemplary embodiment of the present invention. The eleventh embodiment is different from the first embodiment only by substituting the motion compensating section 1200 shown in FIG. 15 for the motion compensating section 100 shown in FIG. 2, and the description of the other sections will be omitted herein.

As shown in FIG. 15, the motion compensating section 1200 includes: a motion estimator 1204; a block generator 105; a set of block average calculators 1021, 1231, 1232, 1233; and a set of subtracters 1241, 1242, 1243. The block average calculators 1021, 1231, 1232, 1233 and subtracters 1241, 1242, 1243 together operate as the correction value calculating means as defined in the appended claims. The block generator 105 is the same as that illustrated in FIG. 3, and the description thereof will be omitted herein.

In the following description, only the components associated with the forward prediction will be exemplified, because a similar principle is applicable to the backward or bidirectional prediction.

The block average calculator 1021 receives the target block $S_k$, calculates an average $AS_k$ of pixel values within the target block $S_k$ and outputs the average $AS_k$ to the subtracter 1241.

The block average calculator 1231 receives the reference frame $R_1$ used for forward prediction from the frame memory section 60, calculates an average $AB_{k1}$ of pixel values within a candidate block $B_{k1}$ in the search range of the reference frame $R_1$, and then outputs the average $AB_{k1}$ to the subtracter 1241.

The subtracter 1241 receives not only the average $AB_{k1}$ of pixel values within the candidate block $B_{k1}$, but also the average $AS_k$ of pixel values within the target block $S_k$, obtains a difference De31 and outputs the difference as a correction value to the motion estimator 1204. The difference De31 is given by $$De3m = AS_k - AB_{km} \quad (m=1, 2, 3)$$

That is to say, the difference De31 represents an increase in average $AS_k$ of pixel values within the target block $S_k$ over the average $AB_{k1}$ of pixel values within the candidate block $B_{k1}$.

Receiving the target block $S_k$, pixel data within the search range of the reference frame stored on the frame memory section 60 and the differences De31, De32 and De33, the motion estimator 1204 estimates motion vectors $V_1$, $V_2$ and $V_3$ corresponding to respective prediction modes and outputs them to the block generator 105.

For example, the motion estimator 1204 obtains an estimate $Eb_{k1}$ by the following equation:

$$Eb_{km} = \sum_{i=1}^{n} |s_i - b_{mi} - De3m| \quad (17)$$
$$= \sum_{i=1}^{n} |(s_i - De3m) - b_{mi}|$$

and evaluates a correlation between a candidate block $B_{k1} = \{b_{11}, b_{12}, \ldots, b_{1i}, \ldots, b_{1n}\}$ within the search range and the target block $S_k$. The motion estimator 1204 outputs, as the motion vector $V_1$, a quantity representing distance and direction from a candidate block with the smallest estimate $Eb_{k1}$ (among a plurality of candidate blocks $B_{k1}$ moved within the search range) to the target block $S_k$.

The equation for deriving the estimate $Eb_{k1}$ may be modified in any arbitrary manner so long as the correlation between the candidate block $B_{k1}$ within the search range and the target block $S_k$ can be obtained. For example, the following Equation (18) may also be used:

$$Eb_{km} = \sum_{i=1}^{n} (s_i - b_{mi} - De3m)^2 \quad (18)$$
$$= \sum_{i=1}^{n} \{(s_i - De3m) - b_{mi}\}^2$$

As represented by Equations (17) and (18), the estimate $Eb_{k1}$ is obtained by subtracting the correction value De31 from each pixel value within the target block $S_k$ and then by deriving a sum of differences between the pixel values within the corrected target block $S'_k$ and those within the candidate block $B_{k1}$ in the search range.

As to the backward and bidirectional predictions, the motion estimator 1204 obtains the motion vectors $V_2$ and $V_3$ in similar manners and outputs them to the block generator 105.

As described above, the video coder according to this embodiment obtains such a correction value for each target block $S_k$ as equalizing the average $AS_k$ of pixel values within the target block $S_k$ with the average $AB_{k1}$ of pixel values within the candidate block $B_{k1}$, corrects the pixel values within the target block $S_k$ using the correction value and then obtains the motion vector $V_1$, for example. Thus, the effects of some special presentation such as fading can be eliminated. In addition, even when a part of the frame has a luminance signal level much deviated from an average luminance signal level of the frame, that part can be corrected in an optimized manner. As a result, it is possible to avoid estimating an erroneous motion vector.

In the foregoing embodiment, the pixel values within the target block $S_k$ are corrected. Alternatively, the pixel values within the candidate block $B_{k1}$ in the search range may be corrected, for example.

It should be noted that the coding mode determining sections according to the first through seventh embodiments and the motion compensating sections according to the first and eighth through eleventh embodiments may be used in an arbitrary combination.

Specifically, if the coding mode determining sections of the fourth, fifth and sixth embodiments are combined with the motion compensating section of the eighth, ninth and tenth embodiments, respectively, then a circuit section for obtaining a correction value for the target block $S_k$ can be shared between these two types of sections.

Also, the coding mode determining section according to any of the first through seventh embodiments may be combined with a circuit for generating a predicted block, instead of the motion compensating section.

Furthermore, the motion compensating section according to any of the first and eighth through eleventh embodiments may be combined with a conventional coding mode determining section.

It should be noted that at least part of the components described in the foregoing embodiments are implement able by software.

While the present invention has been described in a preferred embodiment, it will be apparent to those skilled in the art that the disclosed invention may be modified in numerous ways and may assume many embodiments other than that specifically set out and described above. Accordingly, it is intended by the appended claims to cover all modifications of the invention which fall within the true spirit and scope of the invention.

What is claimed is:

1. A video coding method for predictively coding each target block within a target frame relative to a reference frame, the method comprising the steps of:
   a) calculating an estimate of the target block based on pixel values within the target block;
   b) calculating respective correction values for the target block and a predicted block associated with the target block, the predicted block being generated from the reference frame by motion compensation;
   c) correcting the pixel values within the target and predicted blocks using the respective correction values, and calculating a predicted error based on a difference between each said pixel value within the corrected target block and an associated one of the pixel values within the corrected predicted block;
   d) determining a coding mode based on the estimate of the target block and the predicted error; and
   e) coding the target block in accordance with the coding mode determined.

2. The method of claim 1, wherein in the step d), the coding mode is determined by comparing the estimate of the target block to the predicted error, and
   wherein if the estimate of the target block is smaller than the predicted error, then the coding mode is determined as intra-frame coding, and
   if the predicted error is smaller than the estimate, then the coding mode is determined as predictive coding of a type associated with the predicted error.

3. The method of claim 1 or 2, wherein in the step b), respective averages of pixel values within the target and predicted blocks are obtained, and
   wherein in the step c), the average of pixel values within the target block is subtracted from each said pixel value within the target block to correct the pixel value, and the average of pixel values within the predicted block is subtracted from each said pixel value within the predicted block to correct the pixel value.

4. The method of claim 1 or 2, wherein in the step b), an increase in average of pixel values within the target block over an average of pixel values within the predicted block is obtained, and
   wherein in the step c), the increase is subtracted from each said pixel value within the target block to correct the pixel value.

5. The method of claim 1 or 2, wherein in the step b), an increase in average of pixel values within the target frame over an average of pixel values within the reference frame is obtained, and
   wherein in the step c), the increase is subtracted from each said pixel value within the target block to correct the pixel value.

6. The method of claim 1 or 2, wherein each said pixel value within the target block is multiplied in the step c) by the correction value calculated in the step b) such that a ratio of an average of pixel values within the corrected target block to an average of pixel values within the target block is equalized with a ratio of an average of pixel values within the reference frame to an average of pixel values within the target frame.

7. The method of claim 1 or 2, wherein in the step b), a ratio of an average of pixel values within the reference frame to an average of pixel values within the target frame is obtained, and
   wherein in the step c), each said pixel value within the target block is multiplied by the ratio to correct the pixel value.

8. The method of claim 1 or 2, wherein the correction value calculated in the step b) is added to each said pixel value within the target block in the step c) such that a ratio of an average of pixel values within the corrected target block to an average of pixel values within the target block is equalized with a ratio of an average of pixel values within the reference frame to an average of pixel values within the target frame.

9. The method of claim 1 or 2, wherein in the step b), a ratio of an average of pixel values within the reference frame to an average of pixel values within the target frame is multiplied by an average of pixel values within the target block, and then an increase in average of pixel values within the target block over the product is obtained, and
   wherein in the step c), the increase is subtracted from each said pixel value within the target block to correct the pixel value.

10. The method of claim 1 or 2, wherein in the step b), an increase in average of pixel values within the target block over an average of pixel values within the reference frame is obtained, and
    wherein in the step c), the increase is subtracted from each said pixel value within the target block to correct the pixel value.

11. A video coding method for predictively coding each target block within a target frame relative to a reference frame, the method comprising the steps of:
    a) calculating a correction value for the target block;
    b) correcting pixel values within the target block using the correction value, and estimating a motion vector of the corrected target block relative to the reference frame; and
    c) coding the target block in accordance with the motion vector estimated,
       wherein in the step a), an increase in average of pixel values within the target frame over an average of pixel values within the reference frame is obtained, and
       wherein in the step b), the increase is subtracted from each said pixel value within the target block to correct the pixel value.

12. The method of claim 11, wherein each said pixel value within the target block is multiplied in the step b) by the correction value calculated in the step a) such that a ratio of an average of pixel values within the corrected target block to an average of pixel values within the target block is equalized with a ratio of an average of pixel values within the reference frame to an average of pixel values within the target frame.

13. The method of claim 11, wherein in the step a), a ratio of an average of pixel values within the reference frame to an average of pixel values within the target frame is obtained, and wherein in the step b), each said pixel value within the target block is multiplied by the ratio to correct the pixel value.

14. The method of claim 11, wherein the correction value calculated in the step a) is added in the step b) to each said pixel value within the target block such that a ratio of an average of pixel values within the corrected target block to an average of pixel values within the target block is equalized with a ratio of an average of pixel values within the reference frame to an average of pixel values within the target frame.

15. The method of claim 11, wherein in the step a), a ratio of an average of pixel values within the reference frame to an average of pixel values within the target frame is multiplied by an average of pixel values within the target block, and then an increase in average of pixel values within the target block over the product is obtained, and wherein in the step b), the increase is subtracted from each said pixel value within the target block to correct the pixel value.

16. The method of claim 11, wherein in the step a), an increase in average of pixel values within the target block over an average of pixel values within the reference frame is obtained, and wherein in the step b), the increase is subtracted from each said pixel value within the target block to correct the pixel value.

17. The method of claim 11, wherein in the step a); an increase in average of pixel values within the target block over an average of pixel values within a candidate block in the reference frame is obtained, and wherein in the step b), the increase is subtracted from each said pixel value within the target block to correct the pixel value.

18. A video coding apparatus for predictively coding each target block within a target frame relative to a reference frame, the apparatus comprising:

first calculating means for calculating an estimate of the target block based on pixel values within the target block;

correction value calculating means for calculating respective correction values for the target block and a predicted block associated with the target block, the predicted block being generated from the reference frame by motion compensation;

second calculating means for correcting the pixel values within the target and predicted blocks using the respective correction values, and calculating a predicted error based on a difference between each said pixel value within the corrected target block and an associated one of the pixel values within the corrected predicted block;

means for determining a coding mode based on the estimate of the target block and the predicted error; and means for coding the target block in accordance with the coding mode determined.

19. The apparatus of claim 15, wherein the determining means determines the coding mode by comparing the estimate of the target block to the predicted error, and wherein if the estimate of the target block is smaller than the predicted error, then the determining means determines the coding mode as intra-frame coding, and if the predicted error is smaller than the estimate, then the determining means determines the coding mode as predictive coding of a type associated with the predicted error.

20. The apparatus of claim 15 or 16, wherein the correction value calculating means obtains respective averages of pixel values within the target and predicted blocks, and wherein the second calculating means subtracts the average of pixel values within the target block from each said pixel value within the target block to correct the pixel value, and subtracts the average of pixel values within the predicted block from each said pixel value within the predicted block to correct the pixel value.

21. The apparatus of claim 15 or 16, wherein the correction value calculating means obtains an increase in average of pixel values within the target block over an average of pixel values within the predicted block, and wherein the second calculating means subtracts the increase from each said pixel value within the target block to correct the pixel value.

22. The apparatus of claim 15 or 16, wherein the correction value calculating means obtains an increase in average of pixel values within the target frame over an average of pixel values within the reference frame, and wherein the second calculating means subtracts the increase from each said pixel value within the target block to correct the pixel value.

23. The apparatus of claim 15 or 16, wherein the second calculating means multiplies each said pixel value within the target block by the correction value calculated by the correction value calculating means such that a ratio of an average of pixel values within the corrected target block to an average of pixel values within the target block is equalized with a ratio of an average of pixel values within the reference frame to an average of pixel values within the target frame.

24. The apparatus of claim 15 or 16, wherein the correction value calculating means obtains a ratio of an average of pixel values within the reference frame to an average of pixel values within the target frame, and wherein the second calculating means multiplies each said pixel value within the target block by the ratio to correct the pixel value.

25. The apparatus of claim 15 or 16, wherein the second calculating means adds the correction value, calculated by the correction value calculating means, to each said pixel value within the target block such that a ratio of an average of pixel values within the corrected target block to an average of pixel values within the target block is equalized with a ratio of an average of pixel values within the reference frame to an average of pixel values within the target frame.

26. The apparatus of claim 15 or 16, wherein the correction value calculating means multiplies together a ratio of an average of pixel values within the reference frame to an average of pixel values,within the target frame and an average of pixel values within the target block, and then obtains an increase in average of pixel values within the target block over the product, and wherein the second calculating means subtracts the increase from each said pixel value within the target block to correct the pixel value.

27. The apparatus of claim 15 or 16, wherein the correction value calculating means obtains an increase in average of pixel values within the target block over an average of pixel values within the reference frame, and wherein the second calculating means subtracts the increase from each said pixel value within the target block to correct the pixel value.

28. A video coding apparatus for predictively coding each target block within a target frame relative to a reference frame, the apparatus comprising:

means for calculating a correction value for the target block;

a motion estimator for correcting pixel values within the target block using the correction value, and estimating a motion vector of the corrected target block relative to the reference frame; and means for coding the target block in accordance with the motion vector estimated, wherein the calculating means obtains an increase in average of pixel values within the target frame over an average of pixel values within the reference frame, and wherein the motion estimator subtracts the increase from each said pixel value within the target block to correct the pixel value.

29. The apparatus of claim 28, wherein the motion estimator multiplies each said pixel value within the target block by the correction value calculated by the calculating means such that a ratio of an average of pixel values within the corrected target block to an average of pixel values within the target block is equalized with a ratio of an average of pixel values within the reference frame to an average of pixel values within the target frame.

30. The apparatus of claim 28, wherein the calculating means obtains a ratio of an average of pixel values within the reference frame to an average of pixel values within the target frame, and wherein the motion estimator multiplies each said pixel value within the target block by the ratio to correct the pixel value.

31. The apparatus of claim 28, wherein the motion estimator adds the correction value, calculated by the calculating means, to each said pixel value within the target block such that a ratio of an average of pixel values within the corrected target block to an average of pixel values within the target block is equalized with a ratio of an average of pixel values within the reference frame to an average of pixel values within the target frame.

32. The apparatus of claim 28, wherein the calculating means multiplies together a ratio of an average of pixel values within the reference frame to an average of pixel values within the target frame and an average of pixel values within the target block, and then obtains an increase in average of pixel values within the target block over the product, and wherein the motion estimator subtracts the increase from each said pixel value within the target block to correct the pixel value.

33. The apparatus of claim 28, wherein the calculating means obtains an increase in average of pixel values within the target block over an average of pixel values within the reference frame, and wherein the motion estimator subtracts the increase from each said pixel value within the target block to correct the pixel value.

34. The apparatus of claim 28, wherein the calculating means obtains an increase in average of pixel values within the target block over an average of pixel values within a candidate block in the reference frame, and wherein the motion estimator subtracts the increase from each said pixel value within the target block to correct the pixel value.

35. An apparatus for estimating a motion vector for each target block within a target frame relative to a reference frame, the apparatus comprising:

means for calculating a correction value for the target block; and a motion estimator for correcting pixel values within the target block using the correction value, and estimating a motion vector of the corrected target block relative to the reference frame, wherein the calculating means obtains an increase in average of pixel values within the target frame over an average of pixel values within the reference frame, and wherein the motion estimator subtracts the increase from each said pixel value within the target block to correct the pixel value.

36. The apparatus of claim 35, wherein the motion estimator multiplies each said pixel value within the target block by the correction value calculated by the calculating means such that a ratio of an average of pixel values within the corrected target block to an average of pixel values within the target block is equalized with a ratio of an average of pixel values within the reference frame to an average of pixel values within the target frame.

37. The apparatus of claim 35, wherein the calculating means obtains a ratio of an average of pixel values within the reference frame to an average of pixel values within the target frame, and wherein the motion estimator multiplies each said pixel value within the target block by the ratio to correct the pixel value.

38. The apparatus of claim 41, wherein the motion estimator adds the correction value, calculated by the calculating means, to each said pixel value within the target block such that a ratio of an average of pixel values within the corrected target block to an average of pixel values within the target block is equalized with a ratio of an average of pixel values within the reference frame to an average of pixel values within the target frame.

39. The apparatus of claim 35, wherein the calculating means multiplies together a ratio of an average of pixel values within the reference frame to an average of pixel values within the target frame and an average of pixel values within the target block, and then obtains an increase in average of pixel values within the target block over the product, and wherein the motion estimator subtracts the increase from each said pixel value within the target block to correct the pixel value.

40. The apparatus of claim 35, wherein the calculating means obtains an increase in average of pixel values within the target block over an average of pixel values within the reference frame, and wherein the motion estimator subtracts the increase from each said pixel value within the target block to correct the pixel value.

41. The apparatus of claim 35, wherein the calculating means obtains an increase in average of pixel values within the target block over an average of pixel values within a candidate block in the reference frame, and wherein the motion estimator subtracts the increase from each said pixel value within the target block to correct the pixel value.

* * * * *

UNITED STATES PATENT AND TRADEMARK OFFICE
CERTIFICATE OF CORRECTION

PATENT NO.    : 6,591,015 B1
DATED         : July 8, 2003
INVENTOR(S)   : Tomoko Yasunari and Hideki Fukuda It is certified that error appears in the above-identified patent and that said Letters Patent is hereby corrected as shown below:

<u>Column 31,</u>
Line 34, change "step a);" to -- step a), --;
Line 62, change "claim 15" to -- claim 18 --;

<u>Column 32,</u>
Lines 5, 14, 21, 29, 38, 45, 54 and 64, change "claim 15 or 16" to -- claim 18 or 19 --;

<u>Column 34,</u>
Line 33, change "claim 41" to -- claim 35 --;

Signed and Sealed this

Twenty-third Day of March, 2004

JON W. DUDAS
*Acting Director of the United States Patent and Trademark Office*